US006856737B1

(12) United States Patent
Parker et al.

(10) Patent No.: US 6,856,737 B1
(45) Date of Patent: Feb. 15, 2005

(54) NONLINEAR OPTICAL DEVICE

(75) Inventors: Greg Jason Parker, Brockenhurst (GB); Jeremy John Baumberg, Winchester (GB); James Wilkinson, Southampton (GB); Martin David Brian Charlton, Southampton (GB); Majd Zoorob, Southampton (GB); Maria Caterina Netti, Southampton (GB); Nicolas Perney, Southampton (GB); John Lincoln, Wiltshire (GB)

(73) Assignee: Mesophotonics Limited, Southampton (GB)

( * ) Notice: Subject to any disclaimer, the term of this patent is extended or adjusted under 35 U.S.C. 154(b) by 0 days.

(21) Appl. No.: 10/648,797

(22) Filed: Aug. 27, 2003

(51) Int. Cl.$^7$ .............................. G02B 6/00; H01S 3/00
(52) U.S. Cl. ........................ 385/122; 385/14; 385/129; 385/130; 359/333; 359/334; 359/337.5; 359/342; 359/344
(58) Field of Search .......................... 385/14, 122, 129, 385/130, 131; 359/333, 334, 337.5, 342, 343, 344

(56) References Cited

U.S. PATENT DOCUMENTS

| | | | | |
|---|---|---|---|---|
| 6,052,220 A | * | 4/2000 | Lawrence et al. | 359/341.1 |
| 6,236,774 B1 | * | 5/2001 | Lackritz et al. | 385/14 |
| 6,289,027 B1 | * | 9/2001 | Lawrence et al. | 372/6 |
| 6,710,366 B1 | * | 3/2004 | Lee et al. | 257/14 |
| 6,717,717 B2 | * | 4/2004 | Nelson | 359/326 |
| 6,734,453 B2 | * | 5/2004 | Atanackovic et al. | 257/19 |
| 2003/0048975 A1 | * | 3/2003 | Lackritz et al. | 385/14 |
| 2004/0056243 A1 | * | 3/2004 | Atanackovic et al. | 257/19 |
| 2004/0096175 A1 | * | 5/2004 | Tolstikhin | 385/131 |

OTHER PUBLICATIONS

B. Gross et al, "Propagation of Femtosecond Pulses in Focusing Nonlinear Kerr Planar Waveguides" *Optics Communications*, vol. 129, No. 1, Aug. 1996, pp. 143–151.

R. Kolesov, "Optical Continua Generation in a Coherently Prepared Raman Medium" *Physical Review A*, vol. 64, No. 6, pp. 063819/1–8.

A. Fedotov et al, "Frequency–Tunable Supercontinuum Generation in Photonic–Crystal Fibers by Femtosecond Pulses of an Optical Parametric Amplifier" *Journal of the Optical Society of America*, vol. 19, No. 9, Sep. 2002, pp. 2156–2164.

* cited by examiner

*Primary Examiner*—Brian M. Healy
(74) *Attorney, Agent, or Firm*—Nixon & Vanderhye P.C.

(57) ABSTRACT

There is provided a non-linear optical device for enhancing the bandwidth accessible in the nonlinear generation of an optical signal. The device comprises a planar optical waveguide, the planar optical waveguide being operative to generate an optical output from an optical input having an input bandwidth by means of a non-linear optical process, the optical output having a wavelength within an accessible bandwidth, wherein the planar optical waveguide is operative to enhance the accessible bandwidth such that the ratio of the accessible bandwidth to the input bandwidth is at least 4. The device is particularly applicable to broad optical continuum generation, but may also be used in a parametric oscillator or amplifier arrangement with broad tuning range.

46 Claims, 26 Drawing Sheets

NONLINEAR OPTICAL DEVICE

FIELD OF THE INVENTION

The present invention relates to nonlinear optical devices and in particular to a planar waveguide device for nonlinear optical signal generation with large accessible bandwidth, including optical continuum generation.

BACKGROUND TO THE INVENTION

Optical sources which can generate radiation over a wide wavelength range currently have many applications in scientific research, engineering and medicine. Often the application requires the coherence properties associated with laser radiation and so various laser materials have been developed which exhibit a broad gain bandwidth when suitably pumped. A good example is titanium doped sapphire, which is characterized by a gain bandwidth covering the range 650–1100 nm. The coherence properties of lasers based on broadband material systems may be further enhanced in a number of ways. The technique of modelocking permits the utilization of much of the available laser bandwidth to obtain a repetitive train of short (or ultra short) pulses. Alternatively, the laser cavity may contain frequency selective elements to ensure that the laser only emits radiation with a relatively narrow spectrum centered around a particular wavelength. By adjusting a frequency selective element this wavelength may be tuned across the available gain bandwidth.

However, as many laser sources only operate over narrower, well-defined wavelength ranges, nonlinear optical processes have been employed to generate other wavelengths using the output from available laser sources. A wide range of nonlinear optical processes are known, with the common factor being a nonlinear dependence of the electric polarization that is induced in the nonlinear material on the electric field (or intensity) of an optical input, resulting in the generated optical output. The order of nonlinearity relates to the specific integer power of the electric field on which the induced polarization depends. Second order effects include second harmonic generation, which is commonly used to "frequency double" the output from a laser source, and also two-wave mixing. Third order effects are more numerous and include third harmonic generation, four-wave mixing, self-phase modulation, self-focussing and Raman scattering.

As indicated, non-linear optical devices have the advantage that they can be "bolted on" to the output of existing laser sources in order to extend the available wavelength range or simply to generate nonlinearly another well-defined wavelength from the laser radiation. The strength of the nonlinear effect is generally determined by the relevant non-linear coefficient of the material and the peak intensity of the input (pump) beam inside the material. However, other factors such as interaction length and accurate phase-matching can be very important in maximizing the efficiency of conversion in the nonlinear interaction.

Nonlinear processes and materials capable of generating radiation over a wide wavelength range from a relatively narrow band optical input are of particular interest. Optical continuum generation (CG) is an example whereby a cascade of (generally) third order processes enables the generation of a coherent optical signal with a continuous, or near continuous, spectrum over a very broad bandwidth. The continuum generated can be used in its entirety or optically filtered or sliced as the application requires. Optical parametric processes are another example where one or more optical signals that are tunable over a wide bandwidth are generated from an input pump at a fixed wavelength. In particular, the optical parametric amplifier (OPA) provides parametric amplification at two tunable wavelengths (the signal and idler), whereas the optical parametric oscillator (OPO) employs (tunable) optical feedback at one, or both, of these wavelengths to achieve self-oscillation. A variety of techniques have been investigated for enhancing the bandwidth that can be accessed by the nonlinear processes described above.

Optical CG has typically been performed in bulk materials, both liquid and gas, due to the simplicity of implementation and the relatively small sample size required. However, due the low nonlinear coefficient associated with many materials, the characteristic threshold intensity is high and so a high peak intensity laser source is required. This usually takes the form of a modelocked laser system generating very short (or ultrashort) pulses which are then amplified and the radiation focussed tightly onto the target material. Consequently, there is a high attendant risk of surface or bulk damage to the sample unless it is a material exhibiting a high damage threshold such as sapphire, which also exhibits good stability of CG.

One approach to reducing the threshold pulse energy required has been the utilization of optical fibers for CG. Despite a relatively low nonlinear coefficient for the fiber material, the lateral optical confinement ensures that an adequate optical intensity can be maintained throughout a long interaction length of fiber for efficient CG. Nevertheless, the associated pulse energy damage threshold is also reduced and so end facet damage may occur, requiring the cleaving of a new facet or provision of a new fiber entirely. In addition, the stability of CG in optical fibers is typically low, the overall size may limit the compactness of the source and the optical mode properties are not easily compatible with the planar waveguide devices used in photonic integrated circuits.

Another issue associated with CG is the characteristic optical dispersion (variation of refractive index with wavelength) of the device in which the continuum is generated. It is known that the threshold for CG is lowered when the pump is at a wavelength where the dispersion of the device is near zero. Furthermore, due to the proximity of the anomalous dispersion region, more nonlinear processes may be accessed and bandwidth may more easily be generated beyond the zero dispersion wavelength, extending the spectrum further into the infrared. In the case of bulk materials, the characteristic dispersion is simply the material dispersion, which usually lies within the normal dispersion region at the optical wavelengths of interest. But for waveguides, the situation is more complex, with the total dispersion also depending on waveguide and modal dispersion. This provides scope for controlling the total dispersion via the waveguide design parameters. To this end, zero dispersion fibers and tapered fibers have been manufactured.

A further development in the control of fiber dispersion has been the fabrication of the so-called microstructured fiber (MF) or photonic crystal fiber (PCF). These fibers consist of a solid silica core surrounded by an array of air holes running along the fiber, which provides a wavelength-dependent effective index for the cladding and can allow single-mode guidance throughout the visible and near infrared. By suitable choice of arrangement and size of holes, the dispersion properties of the fiber can be tailored, as can the effective area of the propagating mode. Such dispersion engineered fibers have been used to enhance the continuum bandwidth that can be generated from a short pulse pump, resulting in so-called supercontinuum generation. Here, bandwidth in excess of 800 nm has been generated as a result of a cascade of processes, including self-phase modulation (SPM), four-wave mixing (FWM), Raman scattering (RS), soliton formation and decay, soliton self-frequency shifting (SSFS) and self-steepening (SS). However, despite the improvement in CG bandwidth, the microstructured fibers still suffer from the drawbacks associated with more conventional fibers, as outlined above. In addition, there are many materials that can not be fabricated in bulk or fiber form and are therefore unavailable for CG in these configurations.

Another waveguide based approach for enhancing a non-linear phenomenon has been the employment of a planar chalcogenide glass (ChG) waveguide. Here, the intention was to enhance the level of nonlinear phase shift that could be obtained via SPM for a given pump pulse energy, a key application being optical switching for optical communication systems. A thin film of high refractive index GeSe-based glass material formed the core of a planar waveguide that was subjected to pump pulses from an amplified mode-locked fiber ring laser. A maximum peak phase shift of $1.6\pi$ was recorded for an input pulse energy of 461 pJ. However, although the process was accompanied by nonlinear spectral broadening, which resulted in an optical output having a bandwidth broader than that of the input pulse, the degree of spectral broadening was not sufficient to generate an optical continuum.

Planar waveguides have also been employed for enhanced performance in parametric devices, such as the optical parametric oscillator (OPO) and optical parametric amplifier (OPA). Typical devices comprise a layer of periodically poled material such as Lithium Niobate ($Li_2O_3$), also known as PPLN. Although improved performance is obtained in terms of threshold power and conversion efficiency, the available tuning range is still limited.

SUMMARY OF THE INVENTION

According to a first aspect of the present invention there is provided a non-linear optical device comprising a planar optical waveguide, at least a section of the planar optical waveguide being operative to generate an optical output from at least a portion of an optical input having an input bandwidth by means of a non-linear optical process, the optical output having a wavelength within an accessible bandwidth, wherein the planar optical waveguide is operative to enhance the accessible bandwidth such that the ratio of the accessible bandwidth to the input bandwidth is at least 4.

However, it is preferred that the ratio of the accessible bandwidth to the input bandwidth is at least 10.

Here, the term "bandwidth" is defined as the wavelength interval beyond which the spectral radiant intensity remains below a level of –30 decibels (0.001) of the maximum value. The logarithmic definition is appropriate due to the widely differing spectral intensity of the different wavelengths that may be generated by the nonlinear optical process.

Strong optical confinement in the planar waveguide is obtained when the refractive index of the core layer of the waveguide is high. Preferably, the planar waveguide has a core layer with a refractive index of at least 1.7.

A variety of materials exhibit both the high linear and nonlinear refractive index preferred for the core layer in the present invention.

Preferably, the planar waveguide has a core layer comprising a metal oxide material. More preferably, the planar waveguide has a core layer comprising a material selected from a group including the oxides of tantalum, hafnium, zirconium, titanium and aluminium. Alternatively, the planar optical waveguide may have a core layer which comprises silicon nitride (SiN).

The performance and wavelength range of the nonlinear device can be extended by suitable doping of the core material. Preferably, the planar optical waveguide has a core layer which comprises a material doped with a rare earth element. An example is Neodymium (Nd).

Although the performance of the nonlinear device may be characterized in terms of the enhancement of the accessible bandwidth relative to the bandwidth of the optical input, it is also desirable that the device is characterized by a large absolute accessible bandwidth. Preferably, the accessible bandwidth is at least 200 nm. More preferably, the accessible bandwidth is at least 500 nm.

Preferably, the ratio of the accessible bandwidth to the input bandwidth is non-linearly dependent on the peak intensity of the optical input.

A non-linear optical device according to the present invention will typically operate by means of a nonlinear interaction, which comprises one or more third order non-linear optical processes. Preferably, the non-linear optical process comprises on or more processes selected from a group which includes self-phase modulation, self-focussing, four-wave mixing, Raman scattering and soliton formation.

In addition to the simple broad area broad area waveguide configuration, a nonlinear device according to the present invention may comprise other forms of planar, waveguide structure, which may provide enhanced optical confinement. Preferably, the planar waveguide comprises a ridge waveguide. Alternatively, the planar waveguide may comprise a rib waveguide.

One of the problems associated with planar structures, is the coupling in of light from other devices or sources having a different geometry, such as optical fibre. This problem can be mitigated by employing beam shaping or spot-size converting structures, which can be integrated on the same chip.

Preferably, a portion of the planar waveguide is tapered. Preferably, the tapered region is proximate the input of the planar waveguide. It is preferred that the taper is characterized by a gradually increasing waveguide (core) width. However, the taper may be characterized by a gradually decreasing waveguide (core) width. Preferably, the taper is symmetrical.

The non-linear optical device may also comprise other structures for pre-processing of the optical input or post-processing of the optical output. Preferably, a portion of the planar waveguide includes a structure, the structure being operative to modify the optical input and/or optical output.

Preferably, the structure comprises a photonic structure. Such structures may perform many functions and can be tailored by appropriate design. Many examples of the photonic structure (crystal) and applications of photonic structures (crystals) can be found in the Applicant's copending U.S. patent application Ser. Nos. 09/910,014, 10/147328, 10/185,727, 10/196,727, 10/240,928, 10/287,792, 10/287,825 and 10/421,949, the discussion of which is included herein by reference.

Preferably, the structure is operative to filter the optical input and/or optical output. The optical transfer function of the filter may result in changes to both the phase and amplitude of the different spectral components of the optical signal spectrum. For example, particular wavelengths or ranges of wavelengths may be transmitted, whilst others are blocked or reflected.

Preferably, the non-linear optical device has a structure which is operative to compress temporally the optical input and/or optical output. Pulse compression can serve to increase pulse peak power, leading to a stronger induced nonlinear effect and can also pre-compensate for pulse broadening during subsequent propagation due to refractive index dispersion.

Preferably, the non-linear optical device has a structure which is operative to modify the optical dispersion characteristics of the planar optical waveguide. The structure will typically be disposed either proximate or in the region of nonlinear signal generation, and can serve to tailor the waveguide dispersion characteristics to optimize device performance and accessible bandwidth enhancement.

Preferably, the planar optical waveguide comprises a photonic structure which is operative to modify the optical dispersion characteristics of the planar optical waveguide. Alternatively, the planar optical waveguide comprises at least a further planar layer which is operative to modify the optical dispersion characteristics of the planar optical waveguide.

A particular application of the present invention is in optical continuum generation. The nonlinear device can give rise to optical continua and supercontinua characterized by particularly large bandwidth.

Preferably, an optical continuum source comprises a non-linear optical device according to the first aspect of the present invention, wherein the optical output has an optical spectrum comprising an optical continuum as a result of nonlinear broadening of the optical input.

Preferably, the degree of non-linear broadening is by at least a factor of 4.

Preferably, the optical continuum has a bandwidth of at least 200 nm.

Preferably, the degree of broadening is non-linearly dependent on the peak intensity of the optical input.

In order to enhance the continuum generation process it is preferred that the non-linear optical process is seeded with an optical seed input.

A further application of the present invention is in optical parametric devices for the tunable generation and amplification of an optical output over a wide wavelength range.

It is therefore preferred that an optical parametric oscillator comprises a non-linear optical device according to the first aspect of the present invention and means for providing optical feedback at a wavelength within the accessible bandwidth.

Preferably, the optical feedback means is provided at least in part by a photonic structure.

In another application it is preferred that an optical parametric amplifier comprises a non-linear optical device according to the first aspect of the present invention adapted to receive a further optical input to be amplified at a wavelength within the accessible bandwidth.

Of course, there are many other applications of the present invention. Preferably, an optical system includes a non-linear optical device according to the first aspect of the present invention According to a second aspect of the present invention, an optical continuum-source comprises a planar optical waveguide, at least a section of the planar optical waveguide being operative to generate an optical output having an output bandwidth from at least a portion of an optical input having an input bandwidth by means of a non-linear optical process, wherein the optical output has an optical spectrum comprising an optical continuum as a result of non-linear broadening of the optical input, the planar optical waveguide being operative to enhance the ratio of the output bandwidth to the input bandwidth to at least 4, the term "bandwidth" being defined here as the wavelength interval beyond which the spectral radiant intensity remains below a level of −30 decibels (0.001) of the maximum value.

Preferably, the output bandwidth of the optical continuum is at least 200 nm.

Preferably, a portion of the planar waveguide in the optical continuum source includes a structure, the structure being operative to modify the optical dispersion characteristics of the planar optical waveguide.

Preferably, the structure comprises a photonic structure.

Preferably, the optical dispersion characteristics of the planar optical waveguide are modified by the structure to achieve zero dispersion at points along the waveguide. Alternatively, the optical dispersion characteristics of the planar optical waveguide are modified to achieve normal dispersion at a predetermined wavelength.

According to a third aspect of the present invention, an optical parametric oscillator comprises:

a planar optical waveguide, at least a section of the planar optical waveguide being operative to generate an optical output from at least a portion of an optical input having an input bandwidth by means of a non-linear optical process, the optical output having a wavelength within an accessible bandwidth, wherein the planar optical waveguide is operative to enhance the accessible bandwidth such that the ratio of the accessible bandwidth to the input bandwidth is at least 4, the term "bandwidth" being defined here as the wavelength interval beyond which the, spectral radiant intensity remains below a level of −30 decibels (0.001) of the maximum value; and, means for providing optical feedback at a wavelength within the accessible bandwidth.

Preferably, the accessible bandwidth of the optical parametric oscillator is at least 200 nm.

Preferably, a portion of the planar waveguide in the optical parametric oscillator includes a structure, the structure being operative to modify the optical dispersion characteristics of the planar optical waveguide.

Preferably, the structure comprises a photonic structure.

Preferably, the optical dispersion characteristics of the planar optical waveguide are modified to achieve negative (anomalous) dispersion at a predetermined wavelength.

According to a fourth aspect of the present invention, an optical parametric amplifier comprises a planar optical waveguide for receiving a first optical input having a first input bandwidth and a second optical input having a second input bandwidth, at least a section of the planar optical waveguide being operative to amplify the second optical input by generating an optical output from at least a portion of the first optical input by means of a non-linear optical process, the optical output and the second optical input having a wavelength within an accessible bandwidth, wherein the planar optical waveguide is operative to enhance the accessible bandwidth such that the ratio of the accessible bandwidth to the first input bandwidth is at least 4, the term "bandwidth" being defined here as the wavelength interval beyond which the spectral radiant intensity remains below a level of −30 decibels (0.001) of the maximum value.

Preferably, the accessible bandwidth of the optical parametric amplifier is at least 200 nm.

Preferably, a portion of the planar waveguide in the optical parametric amplifier includes a structure, the structure being operative to modify the optical dispersion characteristics of the planar optical waveguide.

Preferably, the structure comprises a photonic structure.

Preferably, the optical dispersion characteristics of the planar optical waveguide are modified to achieve negative (anomalous) dispersion at a predetermined wavelength.

According to a fifth aspect of the present invention, a method for enhancing the bandwidth accessible in the generation of an optical output, comprises the step of providing a planar optical waveguide for receiving an optical input having an input bandwidth, wherein at least a section of the planar optical waveguide is operative to generate an optical output from at least a portion of the optical input by means of a nonlinear optical process, the optical output having a wavelength within an accessible bandwidth, wherein the planar optical waveguide is operative to enhance the accessible bandwidth such that the ratio of the accessible bandwidth to the input bandwidth is at least 4, the term "bandwidth" being defined here as the wavelength interval beyond which the spectral radiant intensity remains below a level of −30 decibels (0.001) of the maximum value.

According to a sixth aspect of the present invention, a method for generating an optical signal comprises the steps of:

receiving an optical input signal having an input bandwidth at an optical input to a planar optical waveguide;

guiding the optical input signal along the planar optical waveguide; and, generating an optical output signal from at least a portion of the optical input signal by means of a non-linear optical process in at least a section of the planar optical waveguide, the optical output signal having a wavelength within an accessible bandwidth, wherein the planar optical waveguide is operative to enhance the accessible bandwidth such that the ratio of the accessible bandwidth to the input bandwidth is at least 4, the term "bandwidth" being defined here as the wavelength interval beyond which the spectral radiant intensity remains below a level of −30 decibels (0.001) of the maximum value.

Thus the present invention provides an extremely flexible nonlinear device, which substantially enhances the bandwidth accessible in a nonlinear optical interaction. The key element of the device is a planar waveguide formed from material having both high linear and nonlinear refractive index, which combines the advantages of strong optical confinement and high intensity over an extended interaction region with those of a highly nonlinear material. The net result is an extremely efficient nonlinear interaction with a considerably enhanced accessible bandwidth, as compared to that achievable in prior art planar devices. The device has particular application in optical continuum and supercontinuum generation and also in broadly tunable parametric devices. The geometry of the planar device makes it particularly amenable to the integration of other functionality on the same chip and also compatible with modem photonic integrated circuits. By using tapers, ridge and rib waveguides, and also pulse compression, dispersion modifying and filtering structures (particularly photonic crystal structures) the performance and range of applications of the device can be greatly improved.

BRIEF DESCRIPTION OF THE DRAWINGS

Examples of the present invention will now be described in detail with reference to the accompanying drawings, in which.

DETAILED DESCRIPTION

The propagation of ultra-short, intense pulses in a high index planar waveguide according to the present invention is accompanied by an extremely large nonlinear spectral broadening, which may be exploited in a number of ways. A particularly useful application is in the generation of optical continua. Although the phenomenon of continuum generation is well known in bulk material and optical fiber, the spectral broadening achieved in planar waveguides according to the present invention exhibits unique characteristics. Unlike optical fiber, the high index planar waveguide enables the generation of a broad continuum of wavelengths by exploiting only a smaller number of nonlinear effects.

Figure 1A:
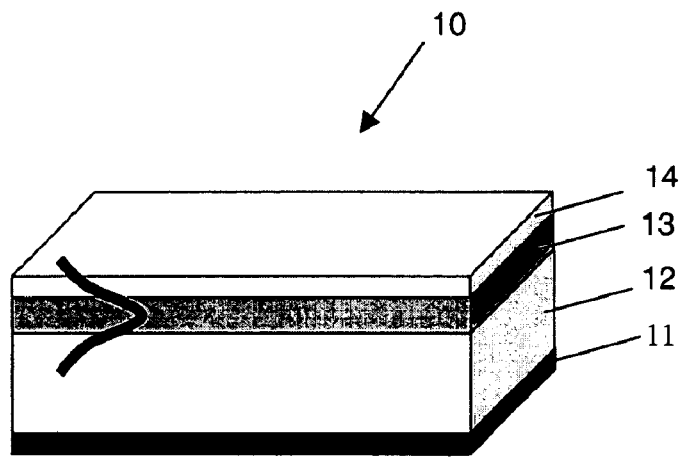
FIGS. 1A an 1B show planar optical waveguides according to the present invention.
Figure 1B:
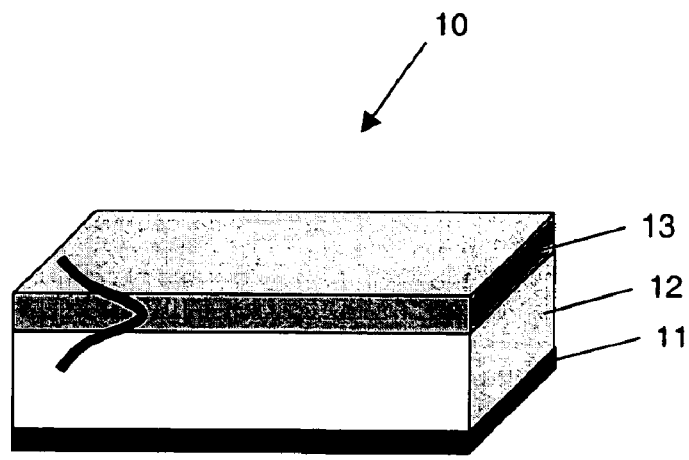

Planar optical waveguides are key devices in the construction of integrated optical circuits and lasers. The potential of those waveguides lies in the way the electric fields can distribute and propagate in the planar platform, providing a unique way to implement functionality on chip. FIGS. 1A and 1B show the typical geometry of two planar optical waveguides 10 according to the present invention. The waveguide 10 shown in FIG. 1A comprises buffer 12, core 13 and cladding 14 layers formed on a substrate 11. Frequently, the cladding layer 14 is not necessary, as shown in FIG. 1B. The main degrees of freedom in engineering such a device are the dimensions of these waveguide layers and the materials used to form them. These two parameters determine how the light (signal) can propagate in the guide. The key material property is the refractive index n, with the condition $n_c > n_s$ required for optical confinement within the waveguide, where $n_c$ is the refractive index of the core layer and $n_s$ is the refractive index of the neighboring buffer and cladding layers. The refractive index is generally a wavelength dependent function, $n(\lambda)$, a property that is known in optics as dispersion.

Figure 2:
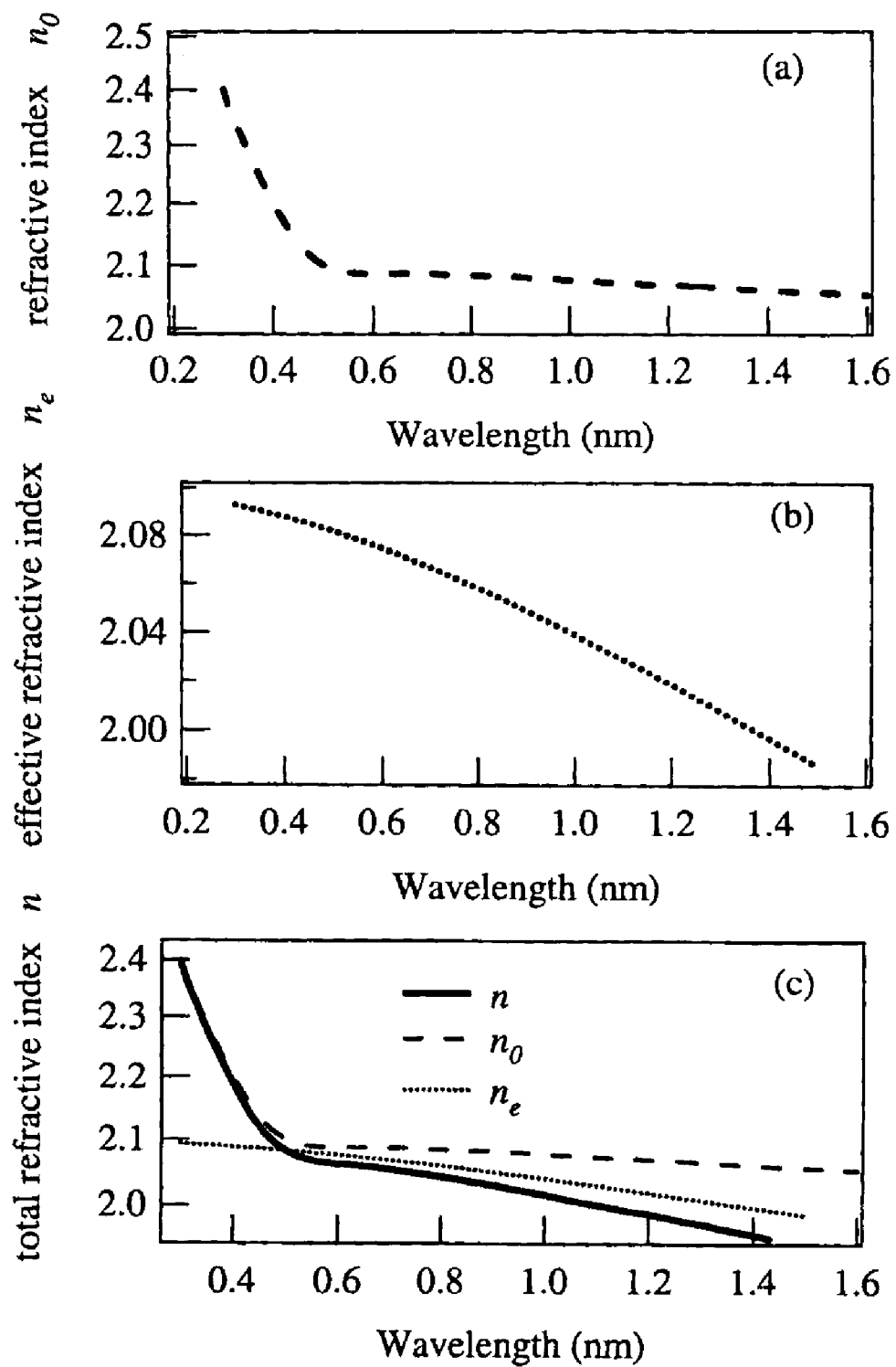
FIG. 2 shows the wavelength dependence of (a) the material refractive index, (b) the effective refractive index and (c) the total refractive index for a waveguide of the type shown in FIG. 1B with a $Ta_2O_5$ core.

The wavelength dependence of the linear refractive index, $n_0(\lambda)$, of a material is the property that accounts for the difference in propagation speed (phase velocity) experienced by different wavelengths (colours) of light, when travelling through the material. The graph of FIG. 2a shows the variation in linear refractive index with wavelength for tantalum pentoxide ($Ta_2O_5$), a preferred material for the core layer of a planar optical waveguide according to the present invention. The linear index is characterized by a steep fall with increasing wavelength in the ultra-violet (UV) region, followed by a much more gradual decline throughout the visible and near-infrared.

However, dispersion in optical waveguides is more complex phenomena, being given by the combined effect of two contributions: material dispersion and waveguide dispersion. Waveguide dispersion may also be characterised in terms of index by introducing an effective refractive index $n_s(\lambda)$, which corresponds to the guiding condition. This effective index takes into account the speed at which a particular optical mode (described by both polarization state and order) propagates in the waveguide. The index is proportional to the propagation constant for the specific mod and its value is always in the range $n_s < n_e < n_c$. Thus, for planar waveguides, $n_e(\lambda)$ depends on both the geometry of the waveguide (core and cladding thickness) and on the value of the refractive indices of the constituent materials.

FIG. 2b shows a dispersion curve for the effective index of a fundamental mode propagating in a planar optical waveguide of the type shown in FIG. 1B. The waveguide comprises a 500 nm thick layer of $Ta_2O_5$ deposited on a 2 µm thick layer of thermal silicon dioxide ($SiO_2$) located on a silicon wafer substrate. The linear refractive indices of the buffer and core materials are $n_s=1.46$ and $n_c=2.1$, respectively. The effective index shows a much more uniform decrease with increasing wavelength than the linear material index. Finally, the total dispersion of the planar optical waveguide, combining the contributions from material dispersion and waveguide dispersion, is shown in FIG. 2c. The variation in total refractive index largely mirrors the material contribution, but exhibits a slightly steeper fall at visible and near-infrared wavelengths. Thus, although material dispersion is a fixed intrinsic property of the waveguide material used, the dispersion characteristics of the total index, $n(\lambda)$, can be tailored by varying the material and layer thicknesses to vary the contribution from waveguide dispersion, $n_s(\lambda)$.

Another useful way to express dispersion is to look at its temporal effects on light propagation within a material. The phase velocity, $v_\phi$ of a wave is inversely proportional ($v_\phi = c/n$) to the linear refractive index of the material, n. The phase velocity is the velocity at which the phase of any one frequency component of the wave will propagate. This is not the same as the group velocity of the wave, which is the rate at which changes in amplitude (known as the envelope of the wave) will propagate. The group velocity, $v_g$, is often thought of as the velocity at which energy or information is conveyed along the wave and is given by $$v_g = c\left[n - \lambda \frac{dn}{d\lambda}\right]^{-1}$$

The group velocity is also generally a function of wavelength. This dependence results in group velocity dispersion (GVD), which causes a short pulse of light to spread in time as a result of different frequency components of the pulse travelling at different velocities. This effect provides one of the limitations on achieving and maintaining short pulse duration and high data rate in optical communication systems. GVD is often quantified by the group delay dispersion parameter:

$$D = -\frac{\lambda}{c}\left(\frac{d^2 n}{d\lambda^2}\right)$$

Figure 3:
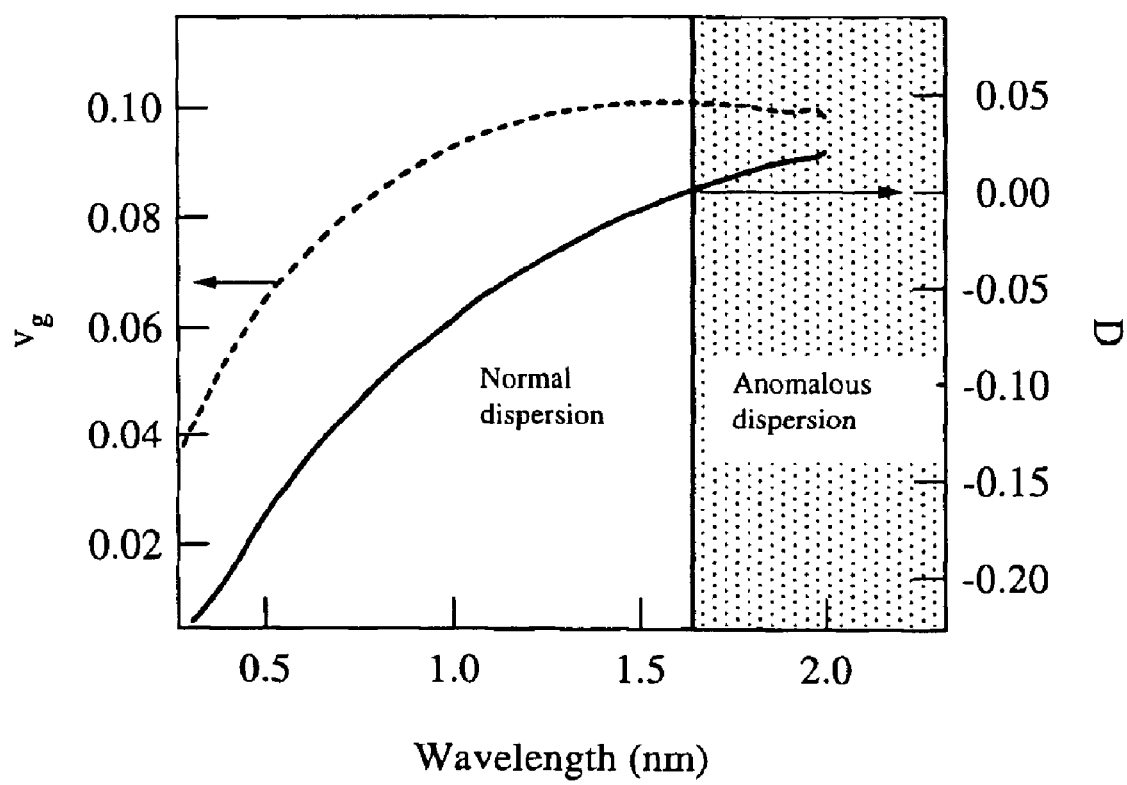
FIG. 3 shows the wavelength dependence of both the group velocity and the dispersion parameter (D) in a $Ta_2O_5$ planar waveguide.

The D parameter accounts for the propagation delay per unit wavelength introduced by a unit length of material, and is usual quoted in units of ps/nm/Km). If D is less than zero, the medium is said to have normal, or positive dispersion. If D is greater than zero, the medium has anomalous, or negative dispersion. When a light pulse is propagating through a normally dispersive medium, the higher frequency components travel slower than the lower frequency components. Conversely, when a light pulse travels through an anomalously dispersive medium, high frequency components travel faster than the lower frequency components. FIG. 3 shows a graph of the GVD and corresponding D parameter for $Ta_2O_5$, as used in a planar waveguide according to the present invention. The group velocity increases to a maximum at a wavelength a little over 1.6 µm before gradually declining. At the same time the D parameter increases, crossing the zero point at around 1.6 µm, in the transition from the normal to anomalous dispersion region.

From the above discussion, it is clear that tailoring the dispersion is a fundamental ingredient for controlling or engineering the propagation of light and, as such, is currently exploited in optical fibre communication. It is noted though that, thus far, only linear processes have been considered. This, however, is not a good approximation when dealing with the propagation of intense, ultra-short laser pulses. High index materials of the type used in the present invention can exhibit nonlinear optical effects, which can be particularly strong when induced by intense, ultra-short laser pulses. Although the presence of these nonlinearities in bulk material has been known since the introduction of ultrafast lasers, the more recent diffusion of planar waveguides and use of optical fibres in optical circuits has boosted investigation of nonlinear optical effects in such systems.

Figure 4:
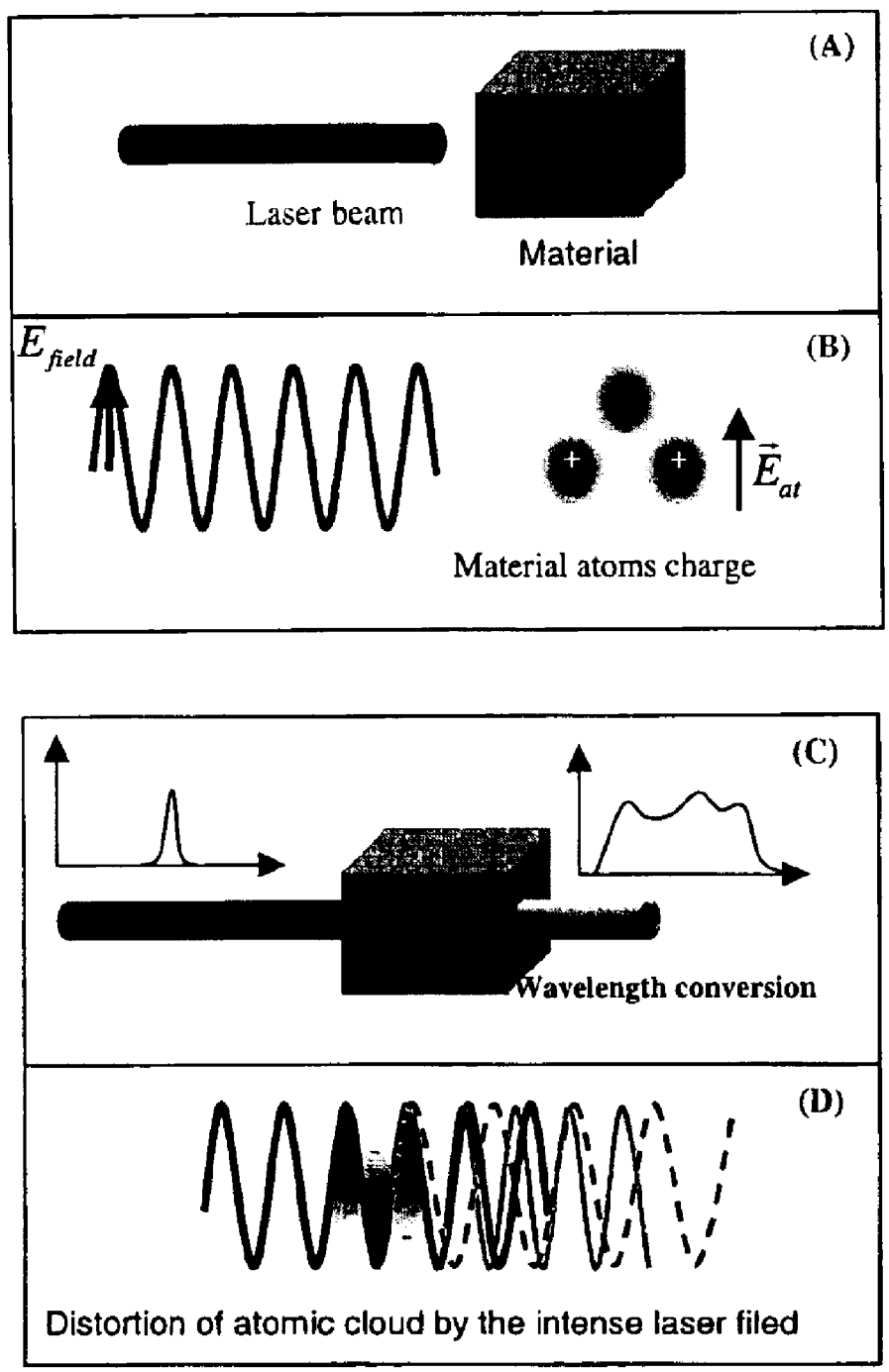
FIGS. 4A to 4D illustrate, on a macroscopic and microscopic level, a nonlinear optical interaction between light and matter.

One of the most important characteristics of ultra-short laser pulse interaction with matter is the delivery of high energy in a very short time (~100 femtoseconds=$10^{-13}$ s) without permanently damaging the material. The light pulse itself can induce a whole range of physical phenomena as it propagates through the material. When the electric field, $E_{light}$, of a laser pulse is comparable with the internal field, $E_{at}$, of the atoms in the material, the laser light can "drive" the atoms and, in turn, be modified by this interaction. A simple representation of such an interaction is illustrated in FIGS. 4A to 4D. FIGS. 4A and 4B illustrate the situation before the interaction on a macroscopic and microscopic scale, respectively. One result of the interaction can be the generation of a new range of wavelengths around the input wavelength. This is illustrated on a macroscopic and microscopic scale in FIGS. 4C and 4D, respectively. This may take the form of pulse broadening, to the extent of continuum generation, or a particular combination of discrete input and output wavelengths, known as parametric effects. The strength of the interaction is determined not only by the laser pulse characteristics (spot size, pulse energy and pulse duration) but also by the nature of the material.

A key parameter in quantifying these particular phenomena is the strength of the nonlinearity which can be characterised by an intensity-dependent higher order contribution to the index of refraction, n, as follows $$n(\lambda,r,t) = n_0(\lambda) + n_2(\lambda) I(r,t)$$

where $n_0(\lambda)$ is the ordinary linear index, $n_2(\lambda)$ is the nonlinear refractive index (in units of $m^2W^{-1}$) and $I(r,t)$ is the temporally and spatially varying intensity of the laser pulse. The nature of the linear term has been described previously and gives rise to optical phenomena such as refraction and reflection, in which light is merely deflected or delayed but remains unchanged in terms of its frequency (wavelength).

The nonlinear term is rather different and depends on both the characteristic nonlinear coefficient of the material at the laser wavelength and on the spatial-temporal characteristics of the laser pulse. The higher the nonlinear index of refraction $n_2$ and/or the higher the intensity of the laser pulse, the, stronger the nonlinear effect and the greater the nonlinear contribution to the total refractive index. This third order nonlinear effect is commonly known as the Optical Kerr effect.

One practical use of the Optical Kerr effect is the generation of a range of new wavelengths around the input wavelength. If the spread of wavelengths in broad and continuous, the result is termed an Optical Continuum. When there is both a spatial and temporal variation in the local intensity of the optical input field, the Optical Kerr effect can be resolved into two contributions, known as Self-Focussing (SF) and Self-Phase Modulation (SPM). Both effects have their origin in the spatio-temporal dependence of the refractive index n(/(r,t)), with the spatially-varying contribution, /(r), giving rise to self-focussing and the temporally-varying contribution, /(t), giving rise to self-phase modulation.

Figure 5A:
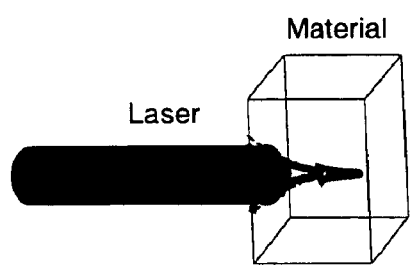
FIGS. 5A, 5B and 5C illustrate the nonlinear process of self-focussing.
Figure 5B:
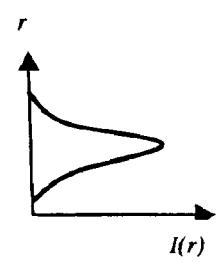
Figure 5C:
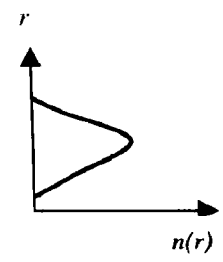

FIG. 5A illustrates the first process of self-focussing in relation to a pulsed laser beam propagating through a nonlinear material. The beam will typically have a Gaussian spatial profile, as shown in FIG. 5A, with the intensity highest at the center of the beam and falling radially so towards the edge of the beam. In the presence of the Kerr effect, the center of the beam will be give rise to a greater nonlinear refractive index within the Kerr medium than at the edges, as shown in FIG. 5C. At the same time, the beam will experience this self-induced refractive index variation, with the phase velocity of the wavefront being less at the center of the pulse than at the dg s. Thus, in effect, a weak positive lens is induced within the medium and the beam is gradually focused as it propagates. This can lead to the propagating beam collapsing into a filament, which concentrates the energy into a reduced volume inside the material. The result of such an intense trapped beam within the material gives rise to an even more intense interaction between the light and the material, leading to a whole range of nonlinear effects.

The intensity of an ultrashort pulse also changes rapidly with time and so, due to the near-instantaneous response of the material, different parts of the pulse will induce different magnitudes of nonlinear refractive index. This time-varying refractive index leads to a phase change, $\Delta\phi(t)$, across the temporal profile of the pulse, which is dependent on the instantaneous intensity in the following manner $$\Delta\phi(t) = \frac{2\pi n_2 I(t) L}{\lambda}$$

where L is the length of the material. Since a time-varying phase corresponds to frequency (frequency is the time derivative of phase, $\omega = -d\phi/dt$), the phase delay, $\Delta\phi(t)$, results in a frequency chirp, $\Delta\omega$, across the pulse, given by $$\Delta\omega = -\frac{d(\Delta\phi)}{dt}$$

Figures 6A, 6B:
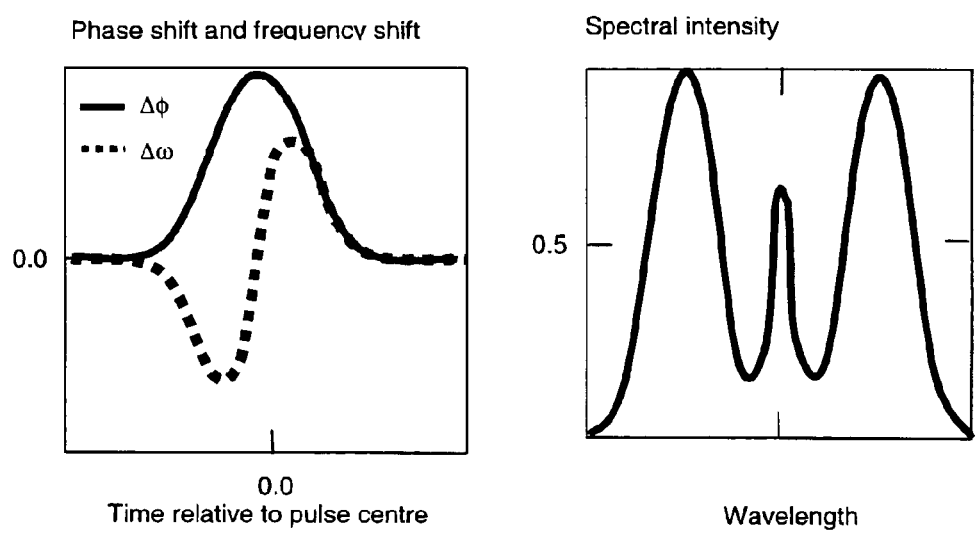
FIGS. 6A and 6B illustrate temporally and spectrally, respectively, the nonlinear process of self-phase modulation of an ultrashort pulse.

As a result, the time-varying nonlinear refractive index of the material leads to what is termed self-phase modulation of the pulse. The frequency shift introduces new spectral components to the pulse, leading to a broadening of the spectral bandwidth. The phase shift and corresponding frequency shift induced across a Gaussian pulse by self-phase modulation is illustrated in FIG. 6A. The resulting impact on the spectrum of the propagating pulse is shown in FIG. 6B. In this example, the initially Gaussian spectrum is broadened, with two lobes either side of a suppressed central wavelength region.

Thus, a planar waveguide with a high associated nonlinear index of refraction has great potential, as it combines the properties of light confinement and guiding with those of a highly nonlinear material. Furthermore, by seeding the interaction with a pulse having a wavelength in the vicinity of zero group velocity dispersion or in the anomalous dispersion region, a wide range of nonlinear processes can occur in the medium. Self-phase modulation, self-focussing, four-wave mixing, Raman scattering, harmonic generation, soliton formation are among the nonlinear effects that may be initiated.

Figure 7:
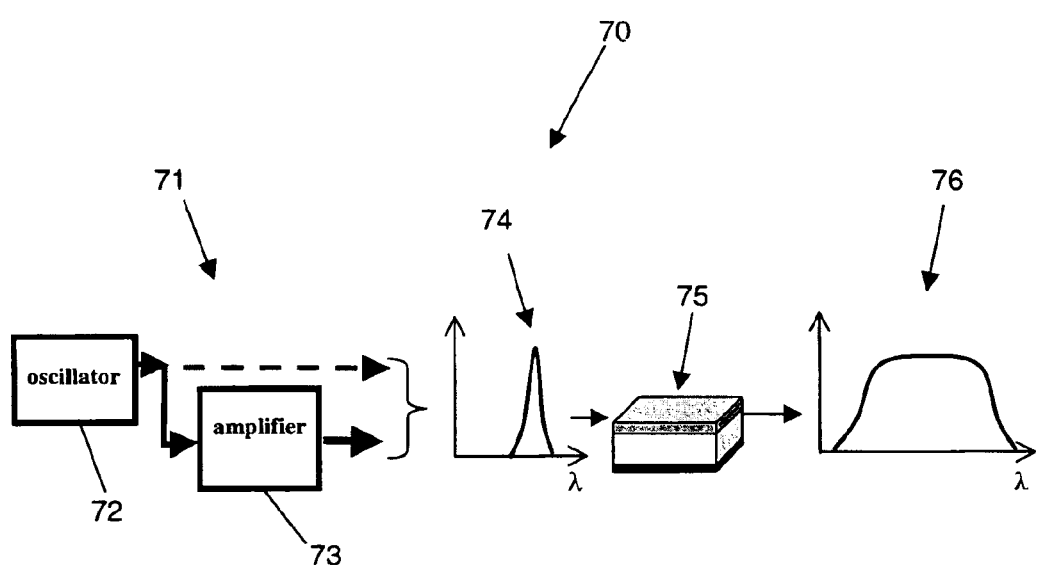
FIG. 7 illustrates an arrangement for optical CG in a $Ta_2O_5$ planar waveguide with a pulsed input.

FIG. 7 shows a schematic of a suitable arrangement 70 for optical continuum generation 76 in a 13 mm long $Ta_2O_5$ planar waveguide 75 according to the present invention. The waveguide comprises a 800 nm thick core layer of undoped $Ta_2O_5$ deposited on a 2 $\mu$m thick buffer layer of thermal silicon dioxide ($SiO_2$), which is located on a silicon wafer substrate. A laser system 71 comprising a modelocked titanium sapphire (TiS) laser oscillator 72 with regenerative amplifier 73 is used to provide ultrashort laser pulses which act as the optical pump source 74 in the interaction. The laser oscillator 72 alone can provide pulses of duration $t_p$=110–150 fs at a repetition rate of $f_r$=76 MHz and a center wavelength of 800 nm. A typical pulse energy of $E_p$=13 nJ corresponds to an average laser power ($P_{av}$=$f_r E_p$) of approximately 1 W and a peak power ($P_{pk}$=$E_p/t_p$) of approximately 90 kW. With amplification provided by the regenerative amplifier, the overall laser system generates 150 fs pulses at a repetition rate of 250 kHz and a center wavelength of 800 nm. Available pulse energy ranges between 40 nJ and 2.4 $\mu$J, corresponding to an average laser power of between 10 mW and 600 mW and peak power of between 0.25 MW and 16 MW.

Figure 8:
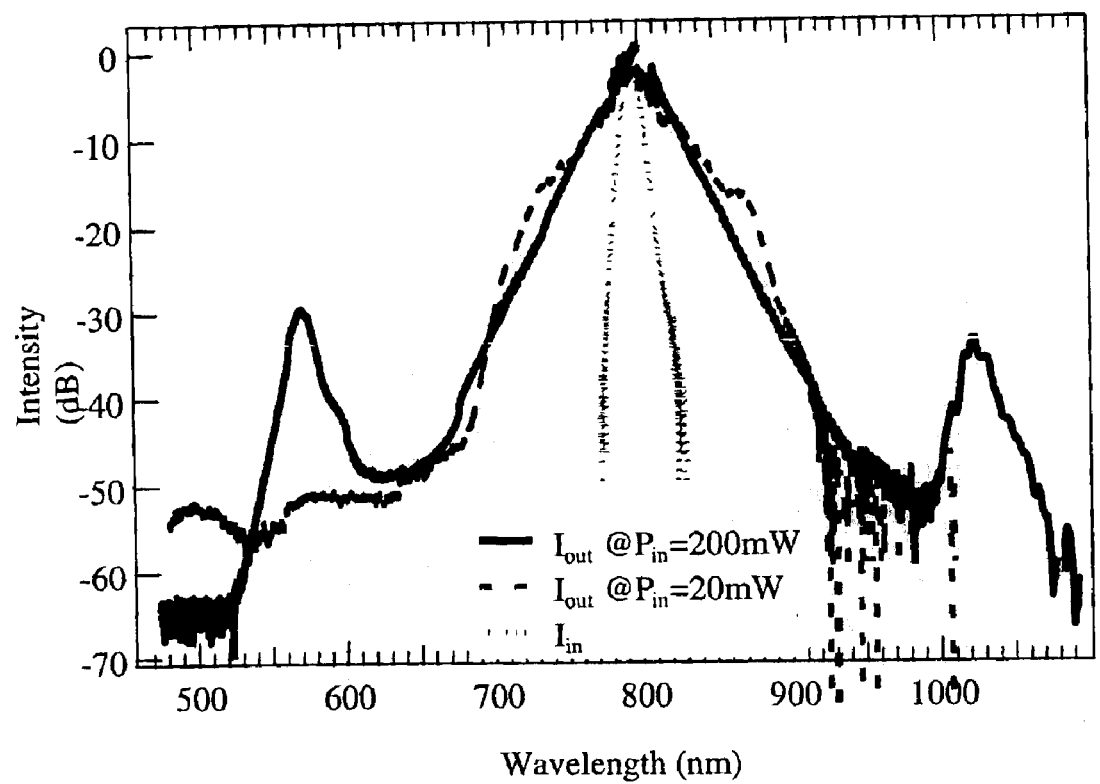
FIG. 8 shows the optical input and output spectra for CG in the arrangement of FIG. 7.

FIG. 8 shows the spectrum of the output signal obtained at two pump powers together with that of the input pump beam for comparison. The results were obtained with amplified input pulse energies of 80 nJ and 800 nJ, corresponding to an average input power of 20 mW and 200 mW, respectively, at a repetition rate of 250 KHz. The input pump pulses have a bandwidth of 10 nm, measured by the full-width at half-maximum (FWHM) intensity. However, as can be seen from the output spectrum, a measure of bandwidth on a logarithmic scale is more appropriate. Therefore, the point at which the spectral (radiant) intensity, $I(\lambda)$, falls permanently below $10^{-3}$(0.001) of the peak (maximum) value, $I_{max}(\lambda)$, is chosen for the measure of bandwidth. On the decibel scale $$\text{Relative Intensity in dB} = -10\log_{10}\frac{I(\lambda)}{I_{max}(\lambda)}$$

the relative intensity equates to the –30 dB point. Thus, the working definition of bandwidth is the wavelength interval ($\Delta\lambda$) between the maximum ($\lambda_{max}$) and minimum ($\lambda_{min}$) wavelengths beyond which the relative intensity is less than –30 dB, as follows:

$$\Delta\lambda=\lambda_{max}(-30dB)-\lambda_{min}(-30dB)$$

As can be seen from FIG. 8, based on this definition, the input pump bandwidth of 50 nm is nonlinearly broadened to 200 nm and 600 nm at an average pump power of 20 mW and 200 mW and peak power of approximately 0.5 and 5.5 MW, respectively. This equates to a degree of nonlinear broadening ($\Delta\lambda_{out}/\Delta\lambda_{in}$) of between 4 and 12 times. Despite the large variation in spectral intensity over the nonlinearly generated spectrum, the small amount of radiation present at wavelengths towards the blue (and UV) and red (and infrared) is sufficient to make the output beam appear "white".

At $\lambda_p$=800 nm, the pump is tuned to a wavelength within the normal dispersion regime of the planar waveguide. Furthermore, the dispersion present in the planar waveguide is less structured than that in present in the microstructured fibres used in prior art continuum generation. As a consequence the nonlinear interaction is dominated by the twin Optical Kerr effects of self-focussing and self-phase modulation. Nevertheless, it is clear that unusually broad continuum generation is occurring, with the spectrum extending into the anomalous dispersion region.

Figure 9:
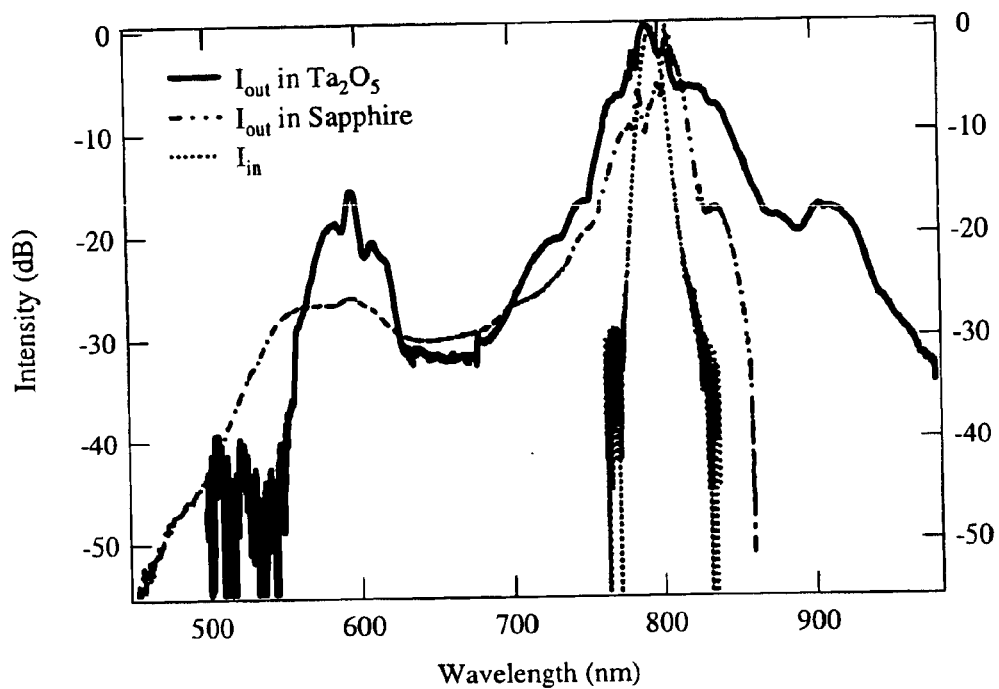
FIG. 9 compares the optical input and output spectra obtained for CG in a $Ta_2O_5$ planar waveguide with CG in known bulk sapphire material.

FIG. 9 shows a comparison between the output spectrum obtained from continuum generation in bulk sapphire, as used in commercial systems, and that obtained in a $Ta_2O_5$ planar waveguide according to the present invention. The optical continuum generated in the planar waveguide extends much further into the near infrared spectral region. Non-linear broadening has also been reported in a chalcogenide glass planar waveguide by self-phase modulation, for the purposes of optical switching. However, although the spectrum of the output is nonlinearly broadened, the degree is much less than that obtained in a waveguide according to the present invention.

Using a planar waveguide with a 500 nm $Ta_2O_5$ core layer, continuum generation is achieved for average pump power as low as 10 mW (pulse energy 40 nJ, peak power 0.25 MW). Alternative dimensions and materials should reduce the threshold sufficiently for continuum generation with unamplified pump pulses from the TiS laser oscillator alone. Suitable core materials include oxides such as hafnium oxide, zirconium oxide, titania, aluminium oxide and also silicon nitride. However, there are many other possible high index candidate materials, some of which can not be fabricated in the bulk but can be deposited in a thin film to form the core of a planar waveguide. Doping these materials with rare earth metals will modify the properties still further. Tantalum pentoxide films doped with Neodymium (Nd) have been investigated and demonstrate that such doping permits continuum generation to be extended into the ultraviolet (UV) spectral region.

Figure 10:
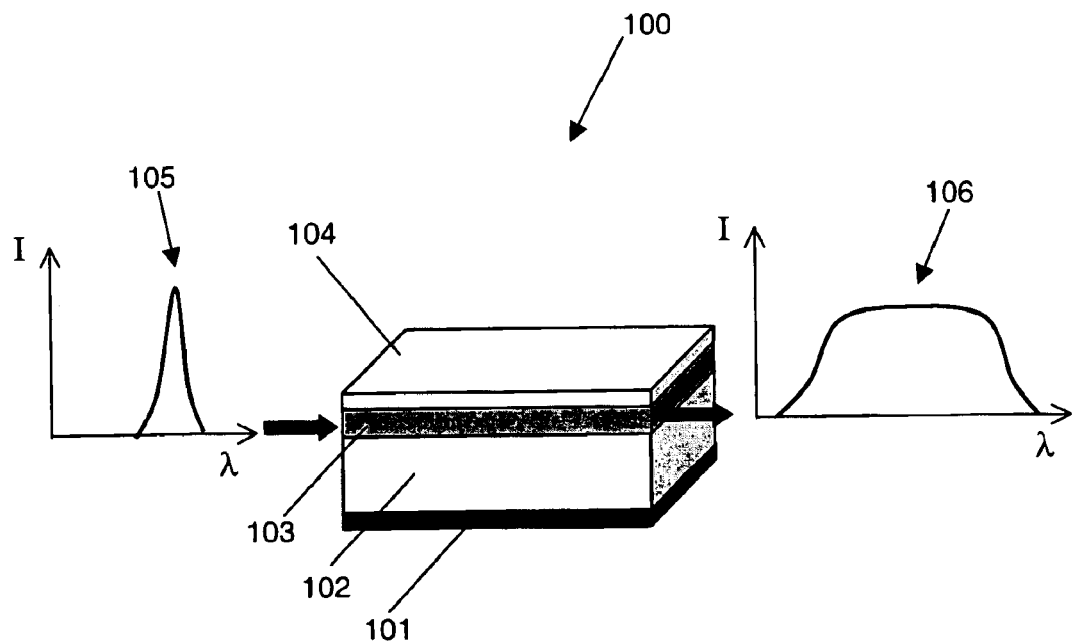
FIG. 10 shows a planar optical waveguide according to the present invention.
Figure 11:
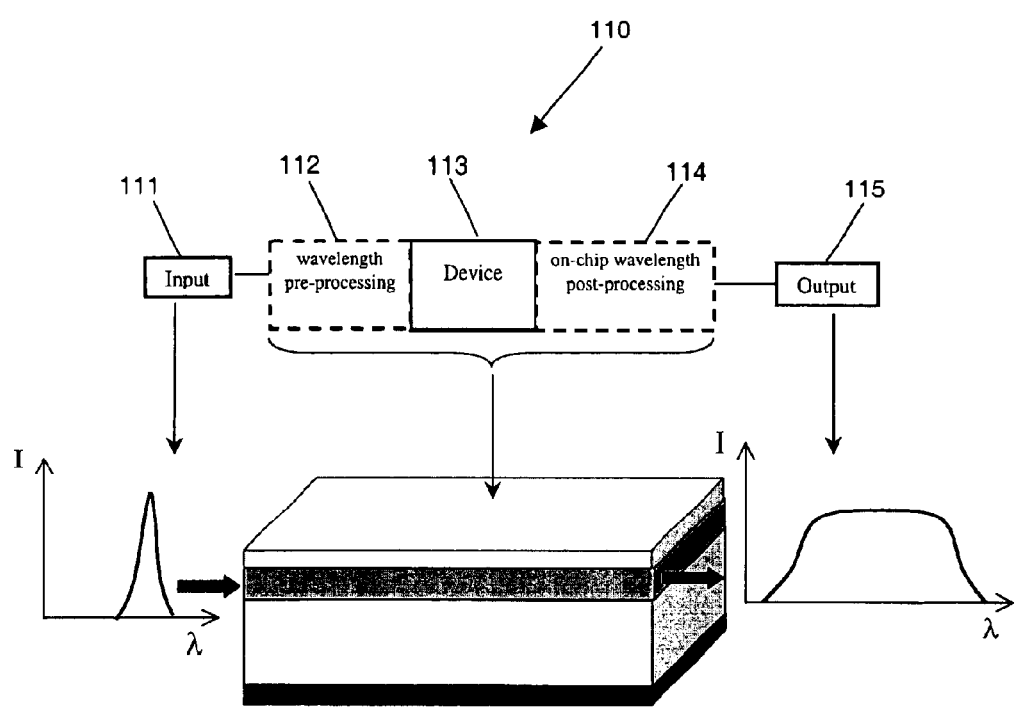
FIG. 11 illustrates the concept of on-chip pre- and post-processing in the device of FIG. 10.

The basic waveguide structure for a planar device 100 according to the present invention is reproduced in FIG. 10. As shown, the device comprises a buffer 102, core 103 and cladding 104 layer formed on a substrate 101, although the cladding layer 104 may be neglected. A high intensity optical input with a comparatively narrow spectrum 105 is used as the pump for nonlinear signal generation in the core layer 103. As a result of the interaction a nonlinearly generated output is obtained with a spectrum, which may contain wavelength components over a very broad accessible range. Nevertheless, despite the impressive performance associated with the basic embodiment shown in FIG. 10, there are many other possible embodiments which can further improve performance and build additional functionality into the device. FIG. 11 illustrates the broad concept whereby the planar waveguide chip 110 comprises not only a portion fulfilling the role of enhancing the accessible nonlinearly-generated bandwidth 113, but also a portion 114 that provides on chip post-processing of the generated signal prior to output 115. Indeed, the chip may also comprise elements 112 to provide pre-processing of the optical input 111.

Figure 12:
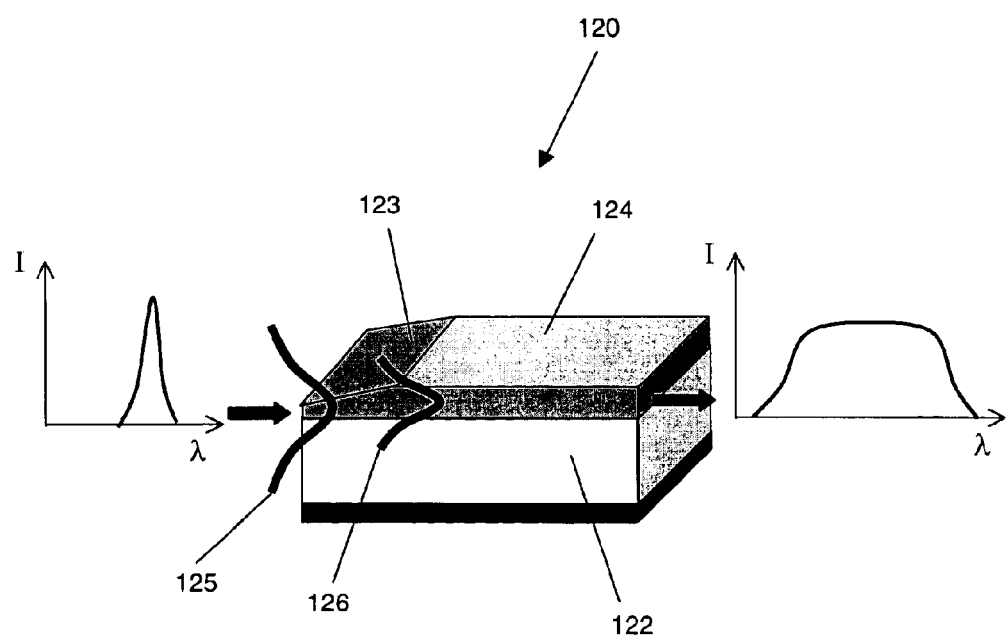
FIG. 12 shows a planar waveguide with vertically tapered input region.
Figure 13:
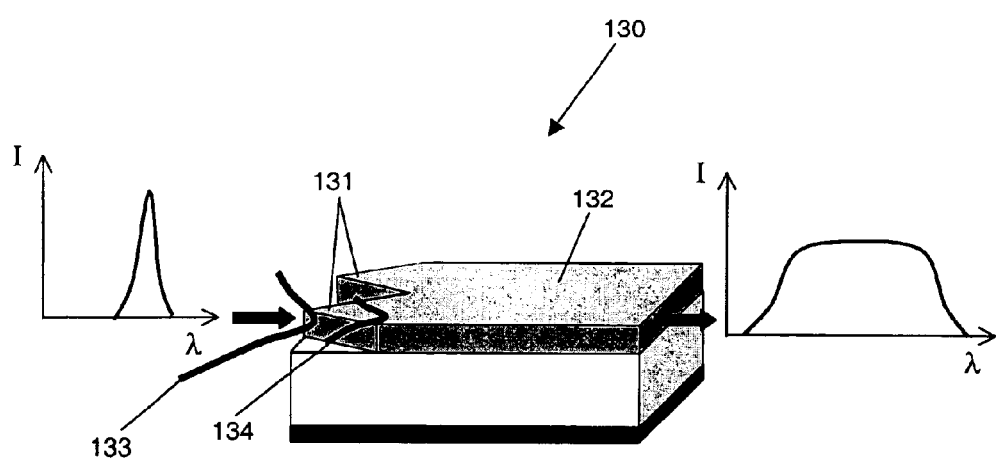
FIG. 13 shows a planar waveguide with laterally tapered input regions.

Efficient coupling of the pump beam into the waveguide core is one of the most important issues for generating continua, as power density is critical for strong nonlinearity. Thus, by launching most of the power into a high index thin film waveguide for optical confinement, high power density can be maintained over an interaction length. In the basic arrangement of FIG. 10, suitably designed external optics are required to beam shape and launch light efficiently into the waveguide. However, an alternative approach is to build beam shaping or mode converting capability into the chip. An effective way to do this by tapering an input region of the waveguide vertically or horizontally, so that there is no longer an abrupt facet extending along a plane perpendicular to the propagation direction. This has the added benefit of reducing the likelihood of surface or bulk damage to the waveguide material in the region of the facet. FIG. 12 shows an embodiment 120 with a vertically tapered input region 123 prior to the main interaction region 124. The tapered, region 123 is characterized by a gradual increase in the thickness of the waveguide core located on the buffer layer 122. This can be achieved during fabrication by growth or etching techniques. Th result of the taper is a gradual coupling of light into the waveguide accompanied by a concentration of the input beam 125 as the beam size reduces 126. The tapered input region allows the use of a pump beam with a modal area much larger than the size of the thin film itself, by acting as spot-size converter. FIG. 13 shows an embodiment 130 with two adjacent horizontally (laterally) tapering input regions 131 prior to the main interaction region 132. This embodiment allows for the independent coupling of two separate beams into the waveguide or, alternatively, a more complex coupling of a single large beam into the waveguide. Again, the input beam 133 reduces in size 134 as it propagates. With a slow smooth taper, input light is adiabatically coupled into a mode supported by the waveguide and able to propagate therein. Provision of an on-chip spot-size converter increases the range of light delivery systems that can be used with the waveguide device, including optical fiber.

Adding on-chip functionality is one of the great advantages of planar waveguide devices. On-chip structures for spatial profiling and beam shaping have already been described in the context of waveguide tapers. However, other types of functionality can be included that modify the phase or amplitude of a beam propagating in the device. In particular, structures for filtering, shaping or slicing the spectra of the optical input or output may be integrated. Such filtering may be performed by more conventional structures with wavelength-dependent absorption, transmission or diffraction properties. However, all the above operations can be performed by photonic crystal structures, which can control propagation of light, both spatially and spectrally, by virtue of their detailed structure which results in forbidden bands of propagation constant.

Figure 14:
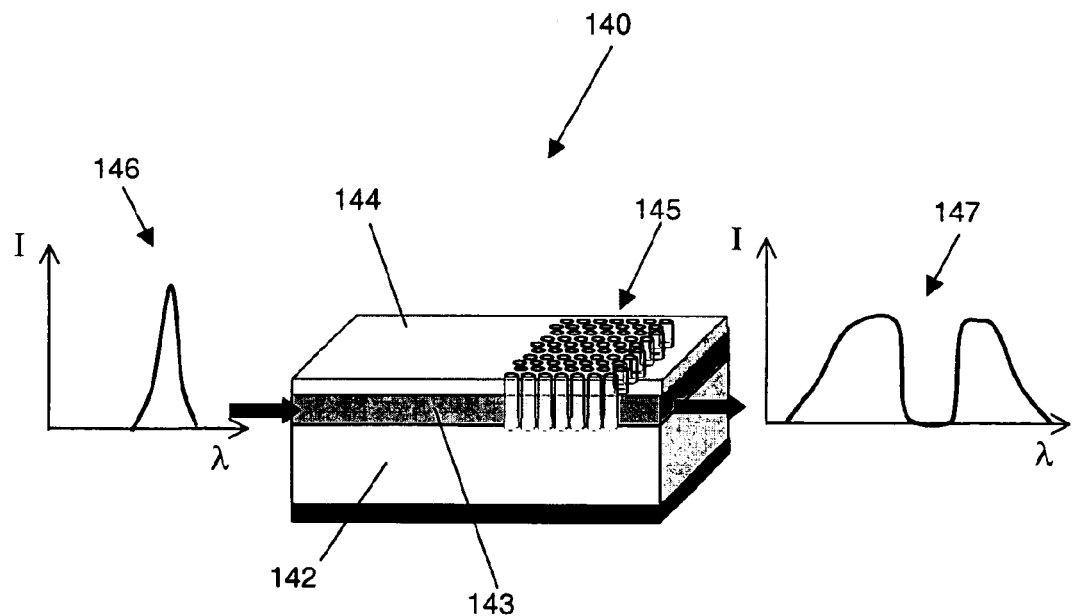
FIG. 14 shows a planar waveguide with a 2-D photonic structure for on-chip filtering.

FIG. 14 illustrates an embodiment of a planar waveguide 140 according to the present invention, which includes a 2-D photonic crystal structure 145 for on-chip post-processing of the optical output generated by the enhanced nonlinear process. In this example, the photonic crystal structure comprises rod-like holes extending through the cladding 144 and core 143 layers, but not into the buffer layer 142. However the rods may extend into the buffer layer or exist in any one or more of the cladding, core and buffer layers. Furthermore, the holes may be filled with any material. This concept is explained in more detail with reference to FIG. 15. The input pulse, 146 is converted into an optical continuum within the planar waveguide and the photonic crystal structure is designed with a complex optical transfer function to filter the spectrum in a particular manner. As shown, the photonic crystal structure 145 filters out a band of wavelengths to produce the spectrum 147. The optical transfer function may include spectral flattening to obtain a more uniform spectral intensity across a range of wavelengths within the continuum. Alternatively, discrete wavelengths or bands of wavelengths can be passed with intervening wavelength ranges blocked. Both forms of spectral processing may be employed in optical comb generation, which has applications in optical communications, including dense wavelength division multiplexing (DWDM). The photonic crystal structures may also perform a beam shaping or optical routing function as well.

Figure 15:
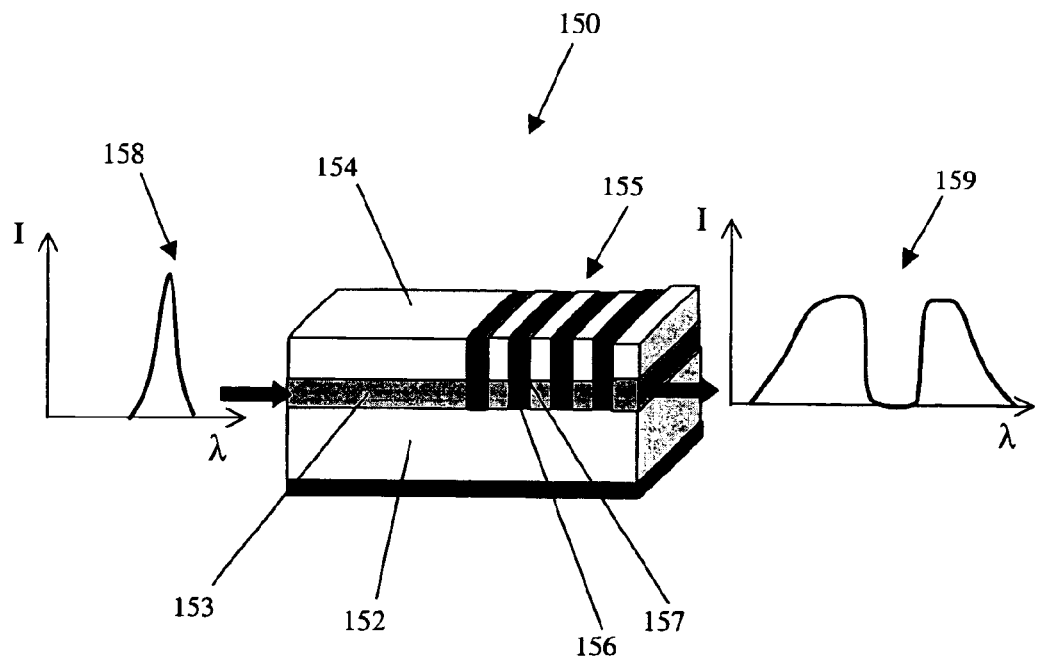
FIG. 15 shows a planar waveguide with a 1-D photonic structure for on-chip filtering.

FIG. 15 shows another embodiment of a planar waveguide 150 according to the present invention, which includes a 1-D photonic crystal structure 155 for on-chip post-processing of the optical output generated by the enhanced nonlinear process. In this example, the photonic crystal structure comprises slabs extending through the cladding 154 and core 153 layers, but not into the buffer layer 152. As shown the slabs comprise a first material 156 in the core layer and a second material in the cladding layer 157. The refractive index of the materials 156 and 157 affects the optical confinement of signals within the waveguide and the optical transfer function as is described in more detail in co-pending U.S. patent application Ser. Nos. 10/196,727, 10/287825 and 10/421,949, also in the name of Mesophotonics Limited. The input pulse 158 is converted into an optical continuum within the planar waveguide and the photonic crystal structure is designed with a complex optical transfer function to filter the spectrum in a particular manner. As shown, the photonic crystal structure 155 filters out a band of wavelengths to produce the spectrum 159.

Figure 16:
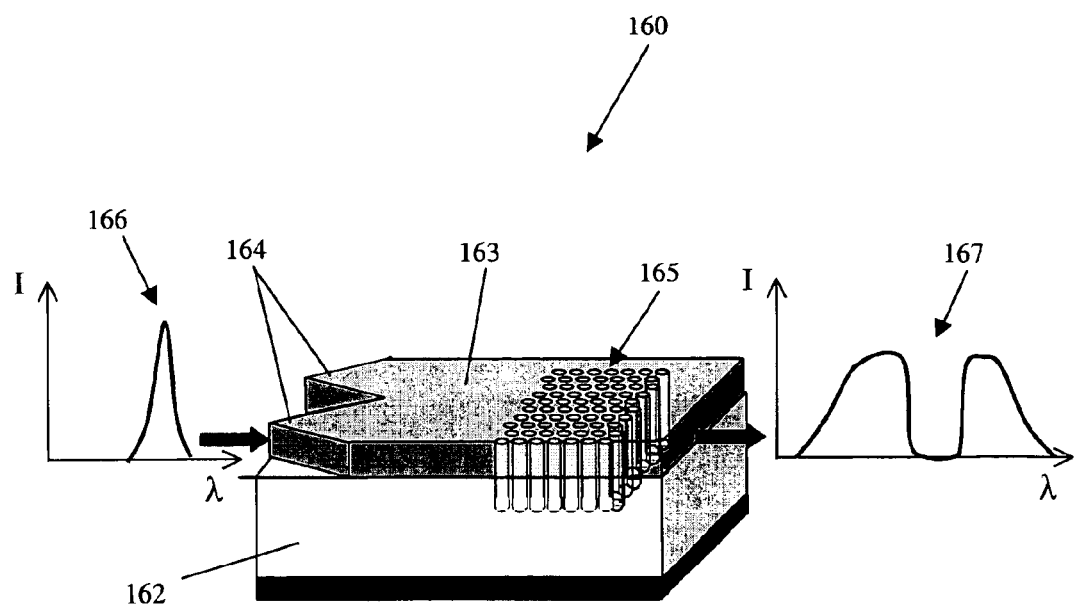
FIG. 16 shows a planar waveguide with laterally tapered input regions and a photonic structure for on-chip filtering.

The on-chip processing functions described so far can, of course, be combined. FIG. 16 shows an embodiment of a planar waveguide 160 according to the present invention that combines a double lateral taper input region 164 with 1D/2D photonic crystal post-processing region 165. The structure includes a buffer layer 162 and a core layer 163 as previously described. The input pulse 166 is converted and output as spectrum 167. Here, both efficient coupling of the optical input is combined with spectral processing of the nonlinearly generated optical output. Careful design of these two features permits optimisation over specific wavelength ranges.

Thus far, only conventional broad area planar waveguides have been considered, which predominantly provide optical confinement in only one dimension, the vertical. Lateral confinement may be provided by employing ridge-or rib type planar waveguide structures, as illustrated in FIGS. 17 and 18.

Figure 17:
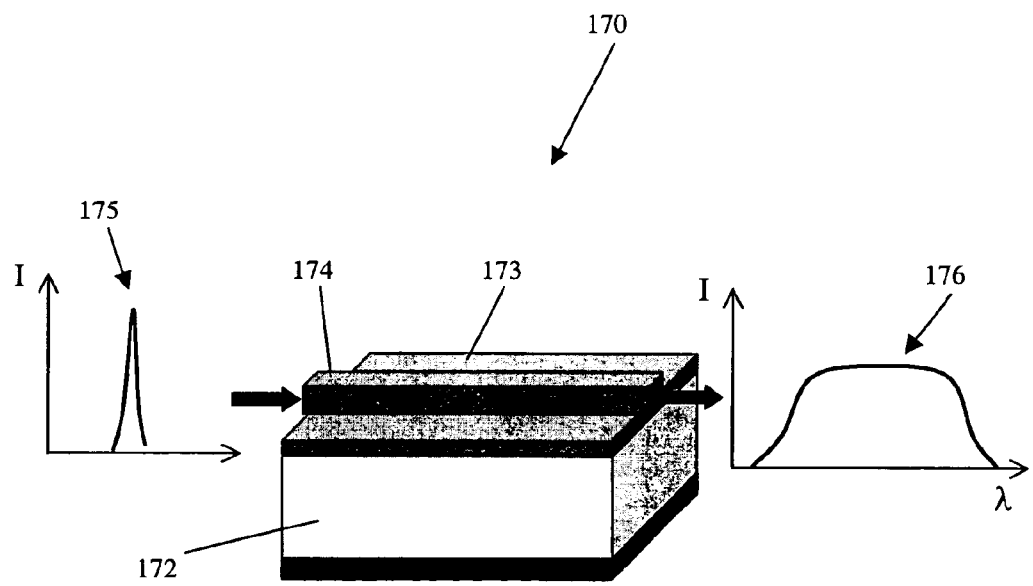
FIG. 17 shows a ridge type embodiment of a planar waveguide.

FIG. 17 shows a device comprising a buffer 172, core 173 and a core ridge 174 layer formed on a substrate. The device operates in the same manner as the planar device illustrated in FIG. 10. Input pulse 175 is converted in a broad continuum represented by spectrum 176.

Figure 18:
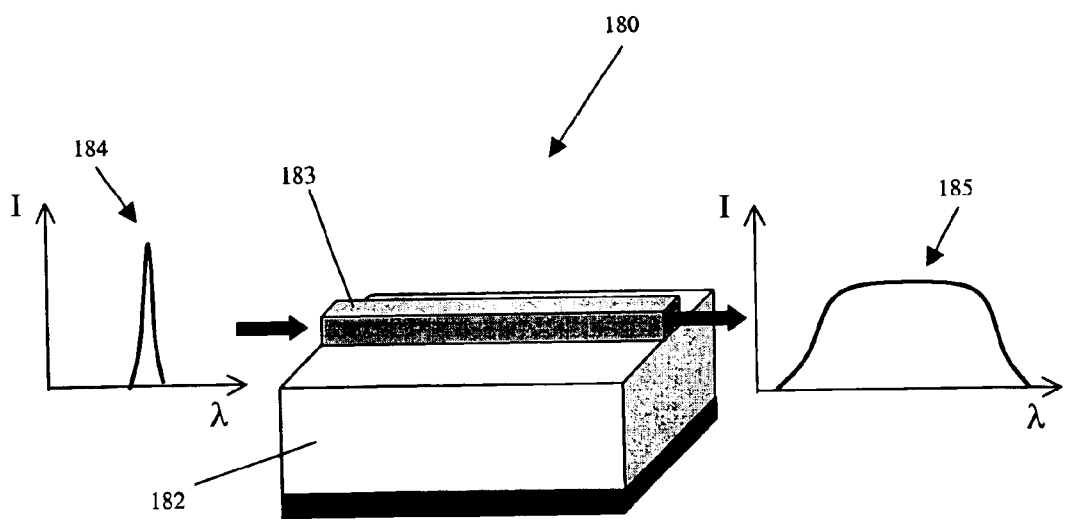
FIG. 18 shows a rib type embodiment of a planar waveguide.

FIG. 18 shows a device comprising a buffer 182 a core rib 183 layer formed on a substrate. Again, the device operates in the same manner as the planar device illustrated in FIG. 10. Input pulse 184 is converted in a broad continuum represented by spectrum 185.

Such structures give rise to higher peak intensity within the guided mode and a correspondingly larger degree of nonlinearity induced in the nonlinear material. This in turn leads to a lower threshold power (pulse energy) requirement for initiating the nonlinear process. Furthermore, a more symmetrical optical mode may be promoted within the waveguide, which is more easily mode matched to other devices, such as optical fiber, when coupling light into and out of the waveguide.

Figure 19:
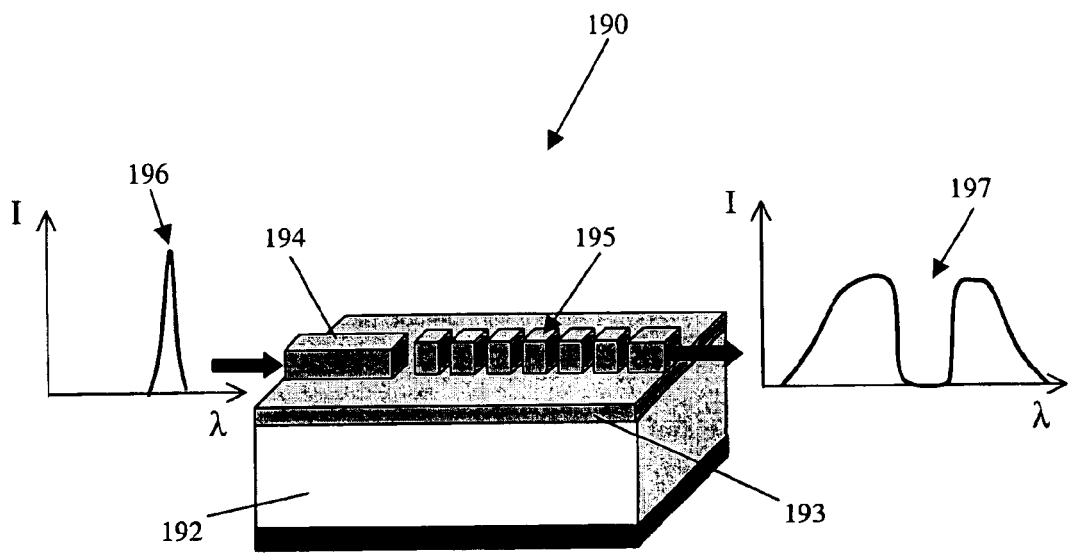
FIG. 19 shows a ridge type planar waveguide with 1-D photonic structure for on-chip filtering.

Of course, many of the pre- and post-processing structures applied to the basic planar waveguide structure may also be applied the ridge and rib waveguide embodiments. FIG. 19 shows the application of 1-D photonic crystal structures to the ridge waveguide of FIG. 17. The structure has the same basic features as the structure of FIG. 17, including a buffer layer 192, core layer 193 and core ridge layer 194. The core ridge layer includes a photonic crystal post-processing section 195 formed from a periodic modulation of the core ridge layer. The periodic modulation of the waveguide structure provides the means for filtering of the signal (optical continuum) that is nonlinearly generated in a region of the waveguide proximate to the input. The input pulse 196 is therefore broadened into a continuum and filtered to produce spectrum 197.

Figure 20:
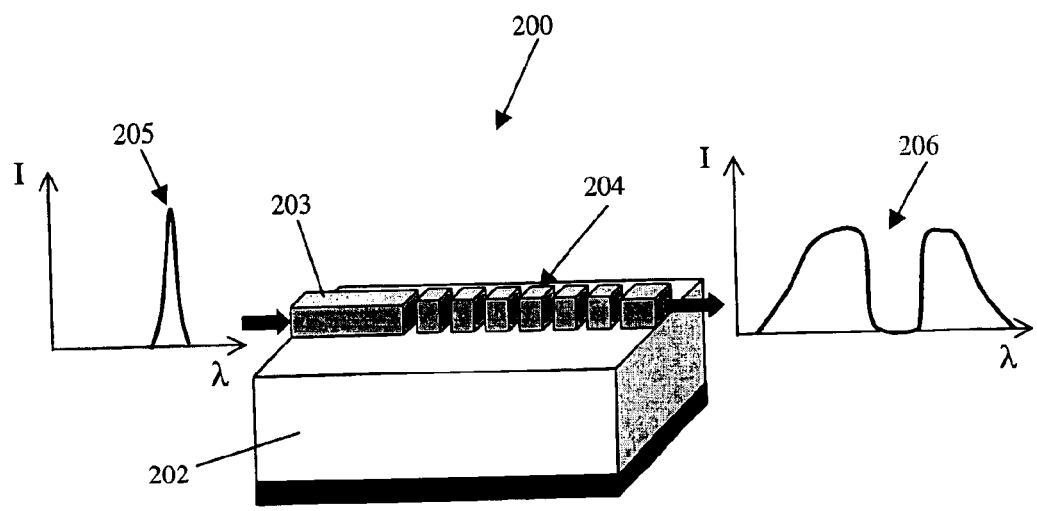
FIG. 20 shows a rib type planar waveguide with 1-D photonic structure for on-chip filtering.

FIG. 20 illustrates the same design applied to a rib waveguide structure 200. The structure includes a buffer layer 202 and a core rib layer 203. The core rib layer includes a photonic crystal section 204 for post processing so that after input pulse 205 has been broadened it is filtered to produce a spectrum 206.

The photonic crystal of FIG. 19 or 20 may be implemented in rod or slab form and need not be periodic, as indicated, but have a varying mark-space ratio according to particular design parameters. The intervening "spaces" may remain air-filled or could be filled with other materials having suitable refractive index properties.

Figure 21:
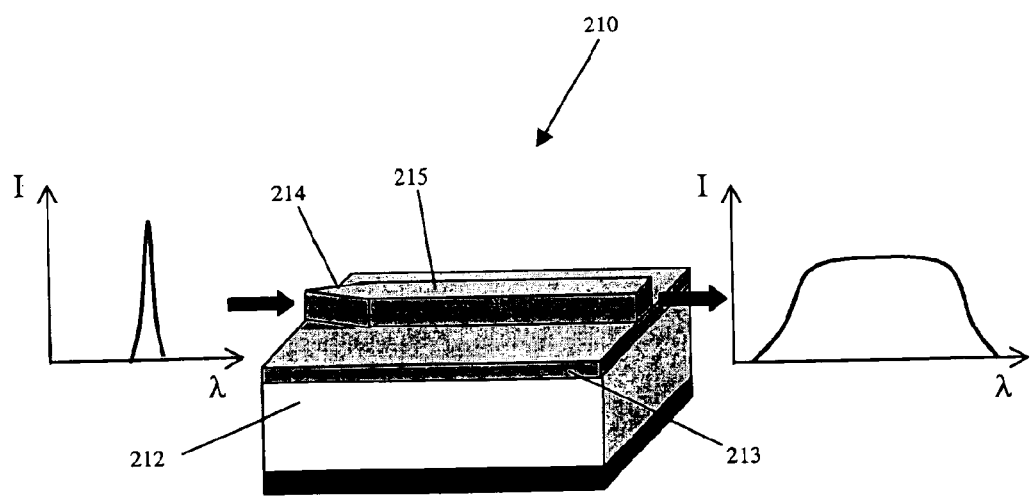
FIG. 21 shows a ridge type planar waveguide with laterally tapered input region.

FIG. 21 illustrates a ridge embodiment 210 having a horizontally tapered input region 214 for spot size conversion and improved optical coupling efficiency. A vertical taper may also be employed. The structure 210, includes a buffer layer 212 and a core layer 213. On the core layer 213 is a core ridge layer 215 and it is the ridge layer that is tapered at input region 214.

Figure 22:
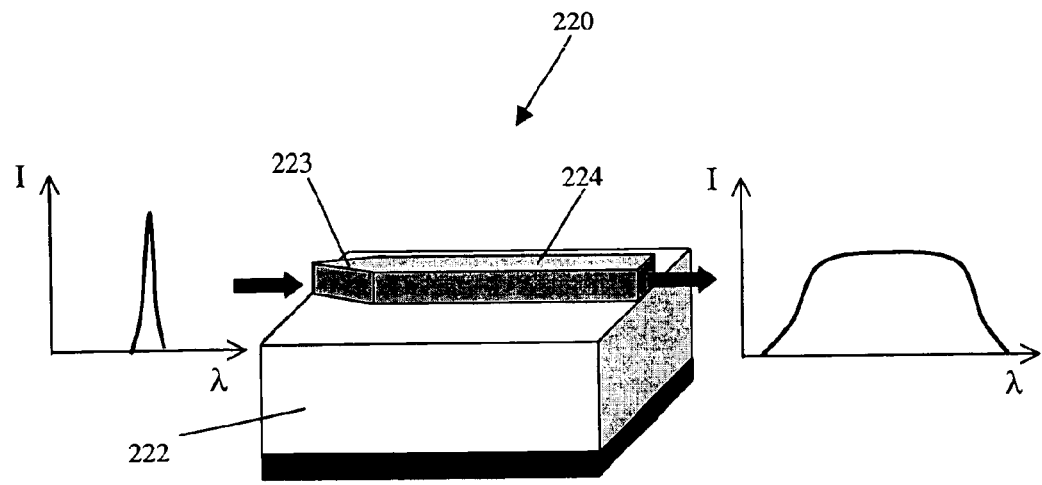
FIG. 22 shows a rib type planar waveguide with laterally tapered input region.

FIG. 22 illustrates the same design applied to a rib structure 220. The structure includes a buffer layer 222 and a core rib layer 224. An input region 223 of the rib layer 224 is horizontally tapered for spot size conversion and improved optical coupling efficiency. A vertical taper may also be employed.

Figure 23:
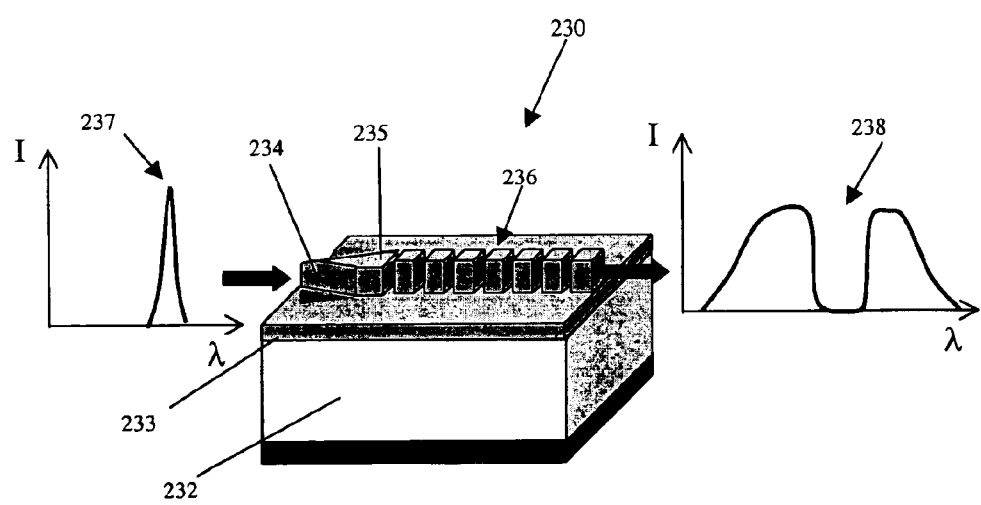
FIG. 23 shows a ridge type planar waveguide with laterally tapered input region and photonic structure for on-chip filtering.

In a manner analogous to FIG. 16. FIG. 23 illustrates the combination of tapers and photonic crystal structures applied to a ridge waveguide embodiment of the present invention. FIG. 23 shows a device 230 including a buffer layer 232, a core layer 233 and a core ridge layer. The core ridge layer includes a tapered input section 234, a continuum generation section 235 and a post-processing photonic crystal section 236. As with the basic waveguide embodiment, the tapers provide for improved optical coupling efficiency and pre-processing of the input beam, and the photonic crystal structures provide for post-processing operations on the nonlinearly generated output beam, including filtering. The input pulse 237 is incident on the tapered section 234 and is output as a spectrum 238.

Figure 24:
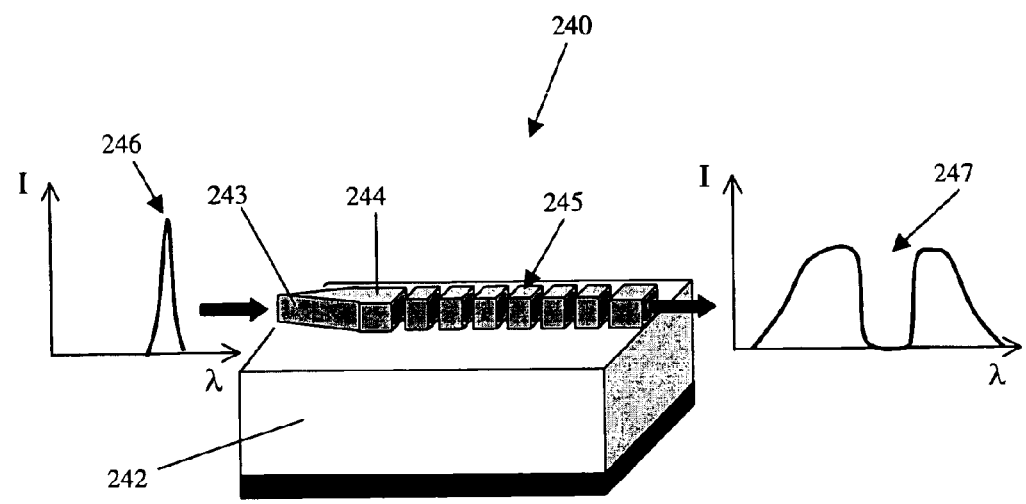
FIG. 24 shows a rib type planar waveguide with laterally tapered input region and photonic structure for on-chip filtering.

FIG. 24 illustrates a rib waveguide embodiment equivalent to the ridge waveguide embodiment of FIG. 23. The structure includes a buffer layer 242 and a core rib layer. The core rib layer comprises a tapered input section 243, a continuum generation section 244 and a post-processing photonic crystal section 245. As with the basic waveguide embodiment, the tapers provide for improved optical coupling efficiency and pre-processing of the input beam, and the photonic crystal structures provide for post-processing operations on the nonlinearly generated output beam, including filtering. The input pulse 246 is incident on the tapered section 243 and is output as a spectrum 247.

Figure 25:
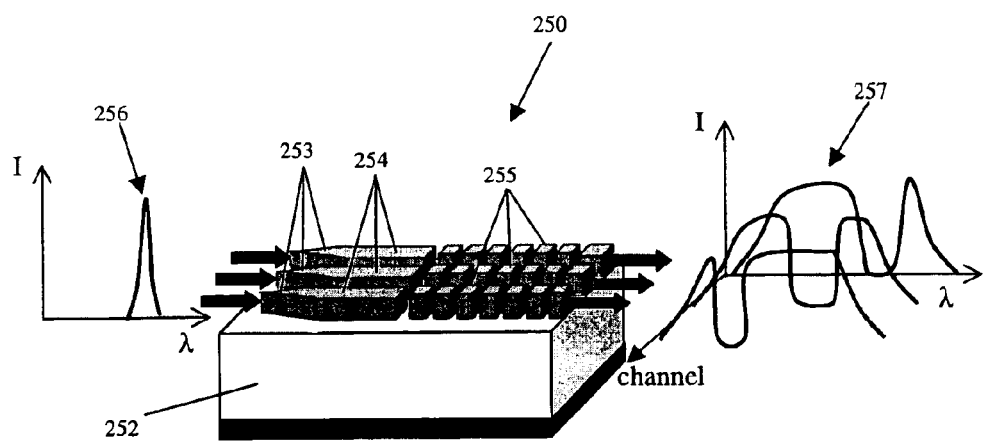
FIG. 25 shows a three-channel rib type planar waveguide with laterally tapered input regions and photonic crystal structures for on-chip filtering.

The geometry of the ridge and rib waveguide structures naturally lend themselves to the construction of a single chip device with multiple waveguide channels. FIG. 25 illustrates the concept with a three channel rib/ridge waveguide device 250, which also incorporates tapered input regions 253 and photonic crystal structured output regions 255. Unlike the broad area waveguide device of FIG. 16, which has two tapered input regions, the device of FIG. 25 comprises three distinct waveguiding channels 254 on a buffer layer 252, each with a separate input taper and photonic crystal structure. Typically, the device would be used with three separate input beams 256, possibly derived from three separate sources. If the three beams are derived from a common source, the three photonic crystals 255 can be designed with different transfer functions so as to sample different wavelength ranges from the continua generated in each of the channels 254. In this way three distinct output spectra 257 are produced. By adjusting the spacing between the ridges/ribs, a degree of cross-walk can be introduced, if desired. Alternatively, the optical input to the three channels can be a single beam in a mode that extends across all three input taper regions.

Figure 26:
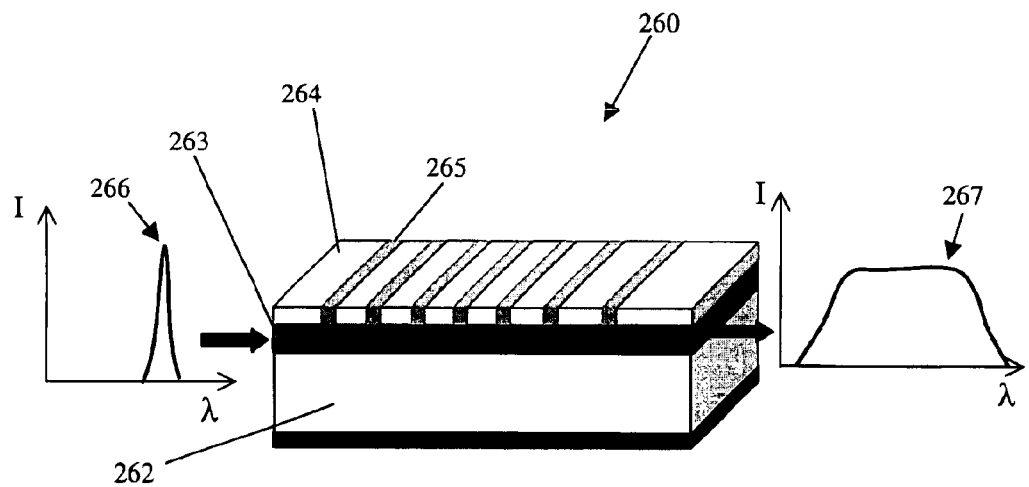
FIG. 26 shows a planar waveguide with a 1-D cladding photonic structure for waveguide dispersion control.

A further embodiment of the present invention incorporates a structure within the region of the planar waveguide where the signal is nonlinearly generated, the structure being designed to modify the local dispersion characteristics of the waveguide in a predetermined way. FIG. 26 shows an example of this embodiment, in which the structure 260 comprises a 1-D photonic crystal 265 located in the cladding layer 264. The structure includes a buffer layer 262 and a core layer 263 on which the cladding layer lies. Input pulse 266 is converted into a continuum 267 in the core layer 263 whilst the photonic crystal structure may be designed to modify the dispersion of the whole waveguide so as to lie in the normal, zero or anomalous dispersion regimes at the central wavelength of the input pump beam. Alternatively, the structure may be designed to yield a specific dispersion, such as zero dispersion, at regular points along the waveguide. This latter example is particularly useful for minimizing dispersion induced increase in pulse duration, which would otherwise lead to reduced peak power.

Figure 27:
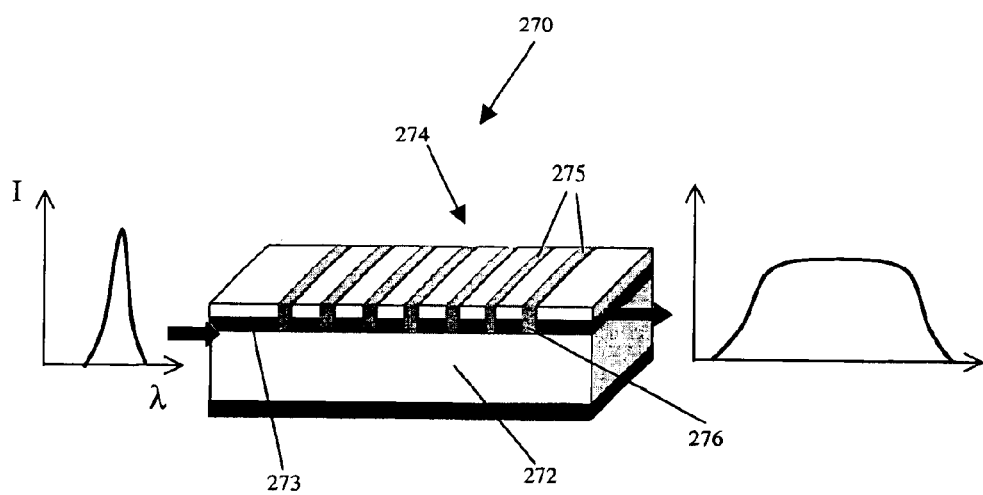
FIG. 27 shows a planar waveguide with a 1-D core/cladding photonic structure for waveguide dispersion control.

FIG. 27 illustrates a similar structure to FIG. 26. The structure 270 of FIG. 27 includes a buffer layer 272, a core layer 273 and a cladding layer 274. The photonic crystal 275 is formed from slabs 276 located in both the cladding layer and the core layer.

Figure 28:
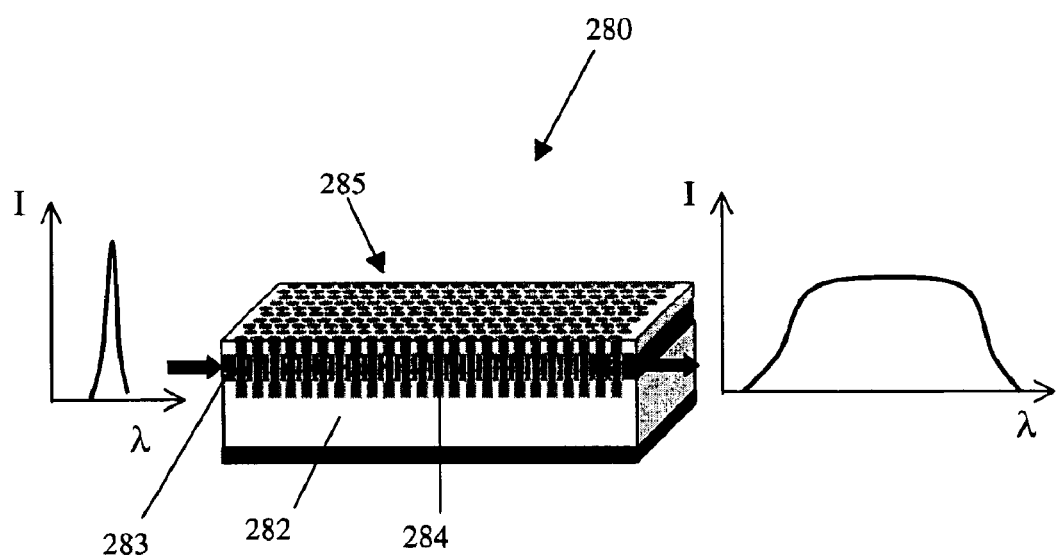
FIG. 28 shows a planar waveguide with a 2-D buffer/core/cladding photonic crystal structure for waveguide dispersion control.

Furthermore, operating near the zero dispersion point can lead to broader continuum generation. FIG. 28 illustrates an example of this embodiment 280 having a 2-D photonic crystal structure 284 that extends from the cladding layer 285, through the core layer 283 and into the buffer layer 282. The 2-D structure permits additional functionality such as beam shaping within the generating region.

Figure 29:
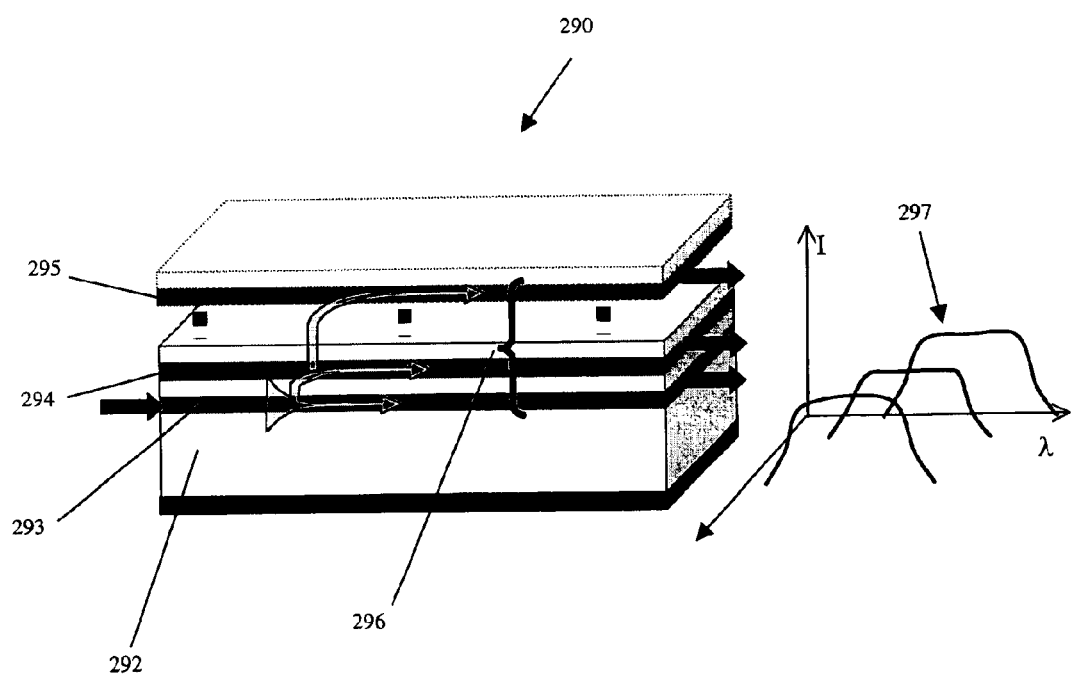
FIG. 29 shows a planar waveguide with a multilayer structure for waveguide dispersion control.

An alternative device structure for modifying the dispersion characteristics of the waveguide is a multilayered structure 290, as illustrated in FIG. 29. Here, the "core" 296 comprises alternating layers 293, 294, 295 of high ($n_1$, $n_2$ ... $n_n$) refractive index and low refractive index on a buffer layer 292. The dimensions and materials used for each layer are calculated according to the desired dispersion characteristics. In this manner three different spectral outputs can be obtained from a single input.

Figure 30:
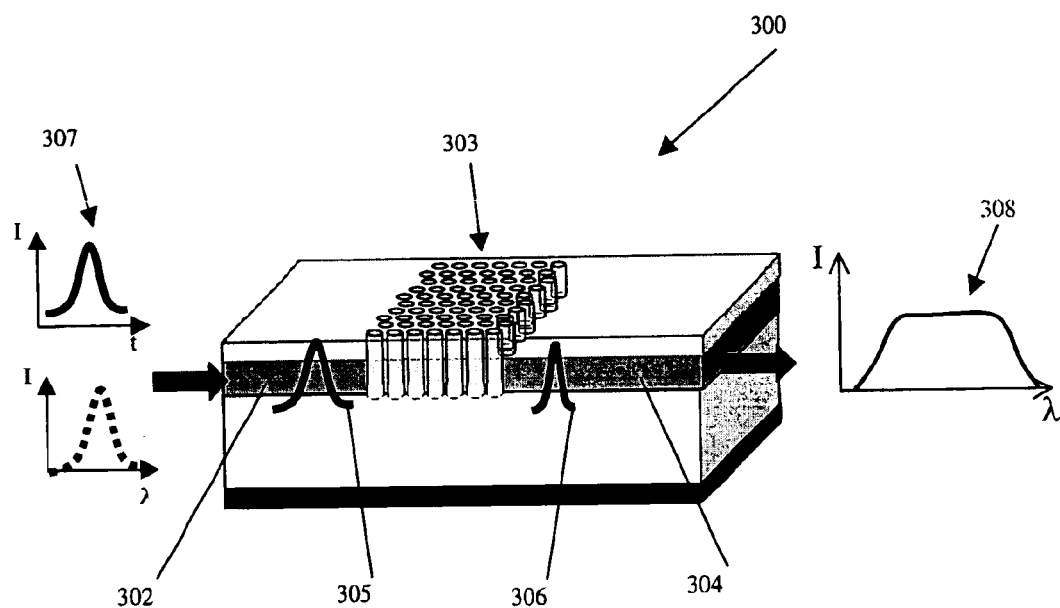
FIG. 30 shows a planar waveguide with 2-D photonic structure for on-chip pulse compression.
Figure 31:
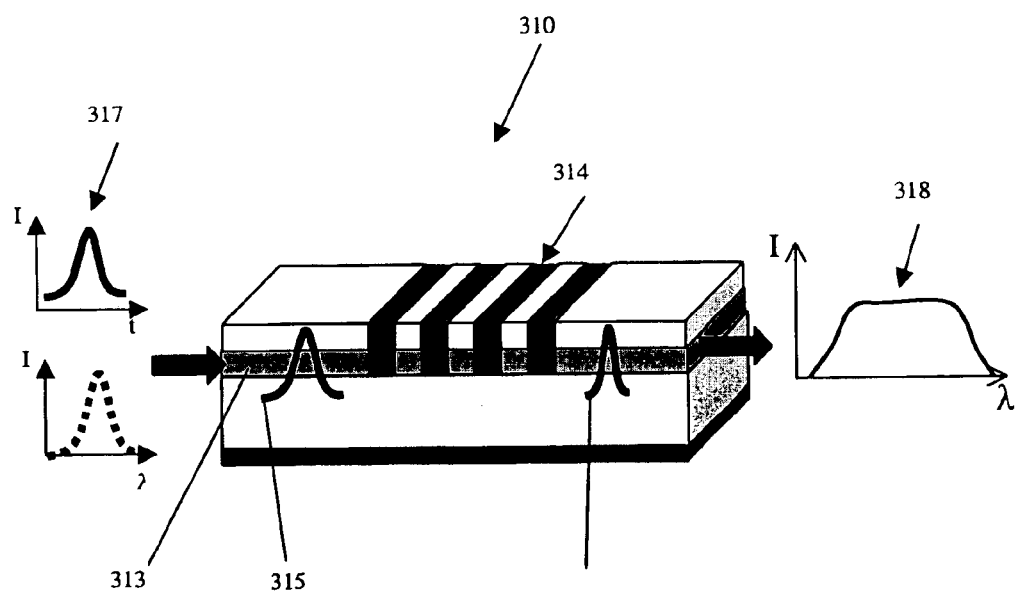
FIG. 31 shows a planar waveguide with 1-D photonic structure for on-chip pulse compression.

As has been described previously, in relation to tapers, the planar waveguide device may comprise integrated structures for the preprocessing of the optical input signal prior to nonlinear generation of the output signal. In the context of a short pump pulse input, one particularly useful function provided by such structure is an on-chip pulse compression. FIGS. 30 and 31 illustrate two examples of this embodiment based on a broad area planar waveguide according to the present invention. Pulse compression is performed by a region of the waveguide having a photonic crystal structure.

FIG. 30 shows an example 300 with a 2-D photonic crystal 303 extending through a core layer 302. Here, the photonic crystal is designed to impart the appropriate phase advance or delay to the different wavelength components of the input beam spectrum 307, in order to give rise to a compression in the time domain. FIG. 30 shows the input pulse 305 delayed by the photonic crystal 303 to produce compressed pulse 306. The compressed pulse then passes through the rest of the core 304 and a continuum 308 is generated.

FIG. 31 shows an example 310 with a 1-D photonic crystal 314 extending through a core layer 313. As with the photonic crystal of FIG. 15, different materials are used in the core layer and the cladding layer. The photonic crystal is designed to impart the appropriate phase advance or delay to the different wavelength components of the input beam spectrum 317, in order to give rise to a compression in the time domain. FIG. 31 shows the input pulse 315 advanced by the photonic crystal section 314 to produce compressed pulse 316. The compressed pulse then passes through the rest of the core and a continuum 318 is generated.

The pulse compression may simply be for the purposes of increasing peak power in the pulse in order to induce a stronger nonlinear effect in the continuum generation section of the core. Alternatively, or in addition, the pulse compression may be a pre-processing of the pulse to compensate for dispersion effects on propagation through the remainder of the waveguide device. Of course, this pre-processing function may be applied to any of the embodiments described previously.

Figure 32:
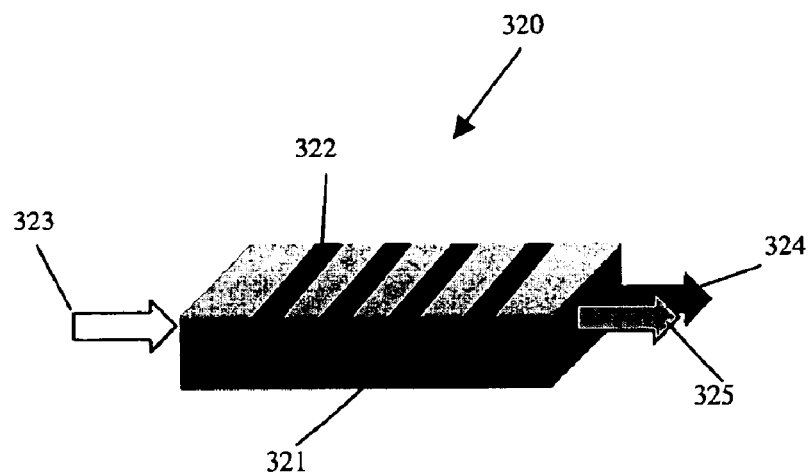
FIG. 32 shows a known PPLN optical parametric generator.

Much of the above discussion has centered on the ability of the present invention to generate large bandwidth, particularly in the context of optical continuum generation. However, another application of the planar waveguide according to the present invention is in parametric devices such as the optical parametric oscillator (OPO) and optical parametric amplifier (OPA). Such devices are used to generate or amplify one or more signals at a discrete wavelength from a input pump beam at a different wavelength. Typically, in a third order parametric process, two output beams are generated, the signal (s) and idler (i), from the single input pump (p) beam. Th total photon energy is conserved in the process such that the pump, $\omega_p$, signal, $\omega_s$, and idler, $\omega_i$, frequencies are related by $\omega_p = \omega_s + \omega_i$ Each signal typically has a relatively narrow bandwidth centered around these frequencies. However, the wavelengths of the signal and idler can be tuned over a broad range by satisfying the appropriate phase matching condition. In the case of bulk nonlinear crystals, this is often achieved by rotation of the crystal. In the case of modem planar devices, quasi phase-matching can be achieved by periodic poling of the material. FIG. 32 shows a known waveguide device 320 of this type based on periodically poled Lithium Niobate ($Li_2O_3$), also known as PPLN. A single frequency input beam 323 is converted into a signal wavelength 324 and an idler wavelength 325 by the waveguide 321. It is not shown in FIG. 32 but the periodically poled regions 322 may be angled and tapered. This permits tuning of the signal and idler wavelengths by translating the waveguide. In addition to spontaneous parametric generation, the device can act as an OPA, whereby a second input signal at either the signal or idler wavelength is amplified.

Figure 33:
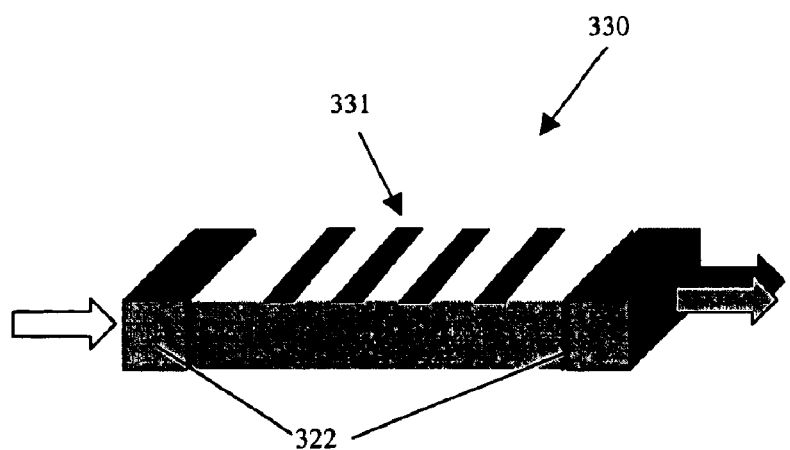
FIG. 33 shows a known PPLN optical parametric oscillator.

Another common parametric device is the OPO, which comprises a suitable nonlinear material (parametric generator) with optical feedback provided at either the signal or idler wavelength, or both. A certain degree of feedback may also be provided at the pump wavelength. In an OPO, the presence of optical feedback, together with the parametric gain provided by the pump beam, gives rise to a laser-like growth in the signal being fed back. The feedback may be in the form of a linear cavity or a ring (loop) cavity. As with a laser, by making one of the feedback elements partially transmitting at the resonating wavelength, an optical output can be obtained, which can be tuned by employing tunable wavelength selective feedback element. FIG. 33 shows a known PPLN waveguide-based OPO 330, which utilizes distributed Bragg gratings 322 at each end of the waveguide 331 to provide optical feedback in a linear cavity.

Figure 34:
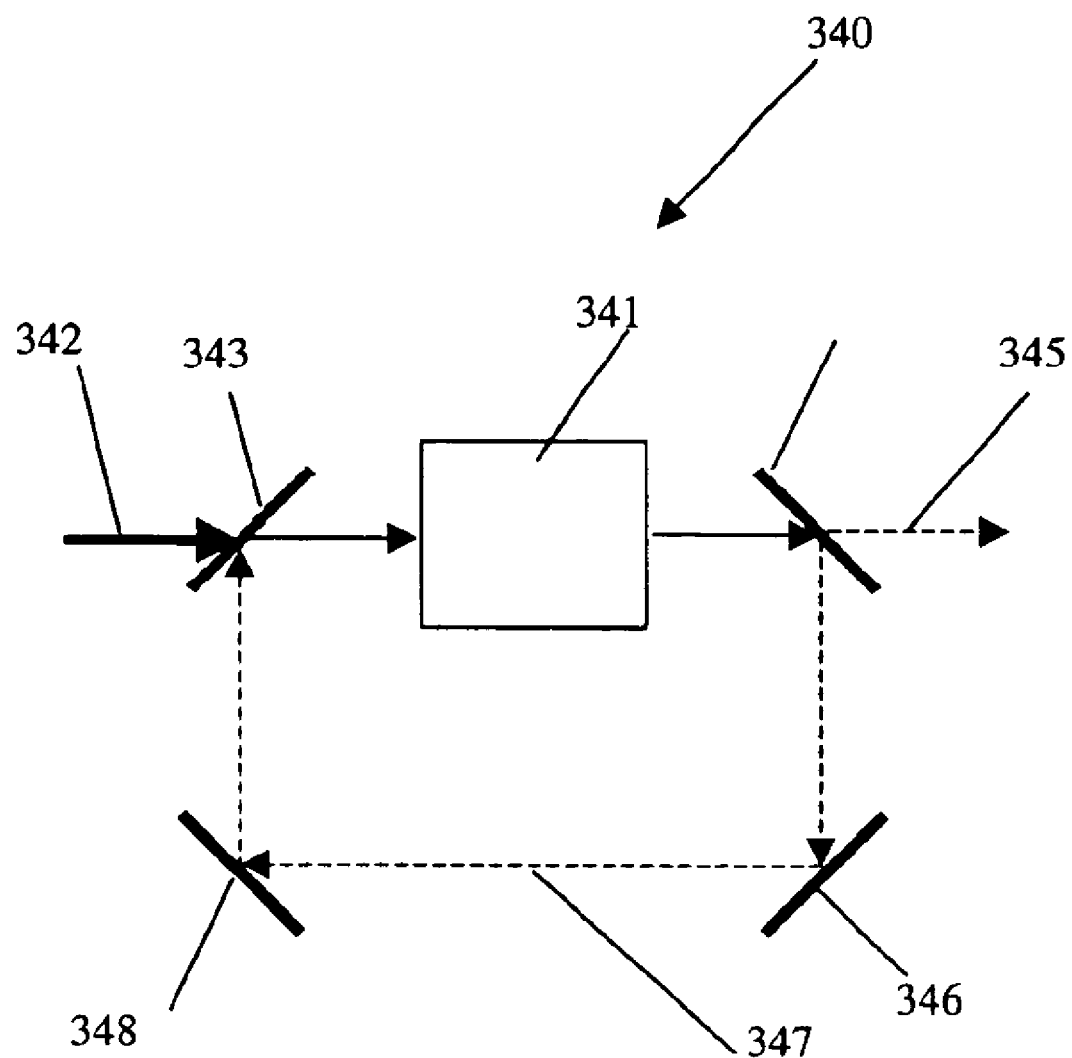
FIG. 34 illustrates the concept of an OPO based on a nonlinear device according to the present invention.

FIG. 34 shows the basic concept of an OPO 340 based on a planar waveguide according to the present invention. The core component is the waveguide region 341, in which an optical output is nonlinearly generated, whilst simultaneously the accessible nonlinearly-generated bandwidth is enhanced. This region provides the parametric generation of the signal and idler, which are tunable over much of the broad accessible bandwidth. In order to achieve optical parametric oscillation, the key addition to the basic device is the provision of optical feedback to form a cavity. This may be a linear cavity with discrete or distributed end reflectors, or a ring cavity as shown in FIG. 34, also comprising discrete or distributed reflectors. FIG. 34 shows an input optical beam 342 incident on a partial reflector 343. Reflector 343 passes the signal 342 to the waveguide region 341. The output from the waveguide region 341 is incident on partial reflector 344. The reflector 344 is designed to be partially transmitting at the resonating wavelength to provide an output 345. A portion of the output is reflected by reflector 344 around a loop 347 including reflectors 346 and 348 back to the reflector 343. The reflected signal is then fed back into the waveguide region 341. The signal fed back into the waveguide region 341 is at the wavelength of the input signal. The reflectors 346, 348 themselves may provide the wavelength selectivity or a specific filter may be inserted in the loop 347 to perform this function.

Figure 35:
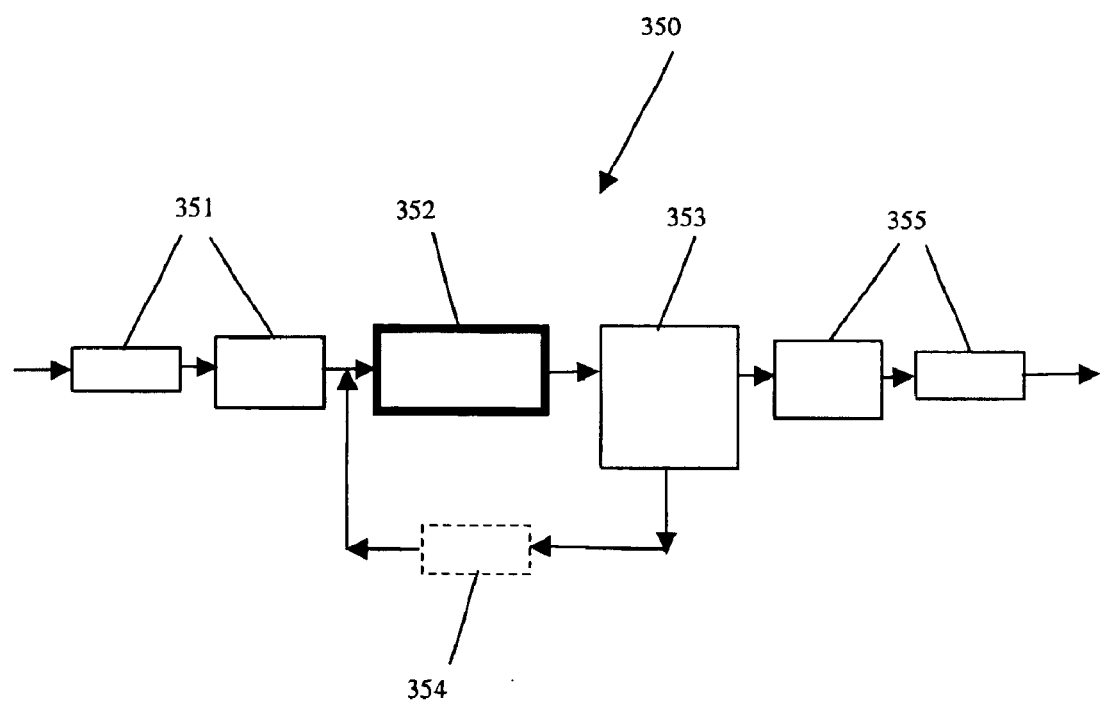
FIG. 35 illustrates the concept of an OPO based on the nonlinear device with prep and post-processing.

FIG. 35 shows a schematic of the basic components for an OPO based on a planar waveguide according to the present invention. The planar waveguide device may incorporate any of the on-chip features described previously, input including tapers, ribs/ridges, pulse compression, dispersion control 351 and post-processing such as filtering and output tapers 355. The waveguide region is indicated at 352 and a partial selective reflector or splitter is shown at 353. The feedback loop is shown with a specific filter 354.

Figure 36:
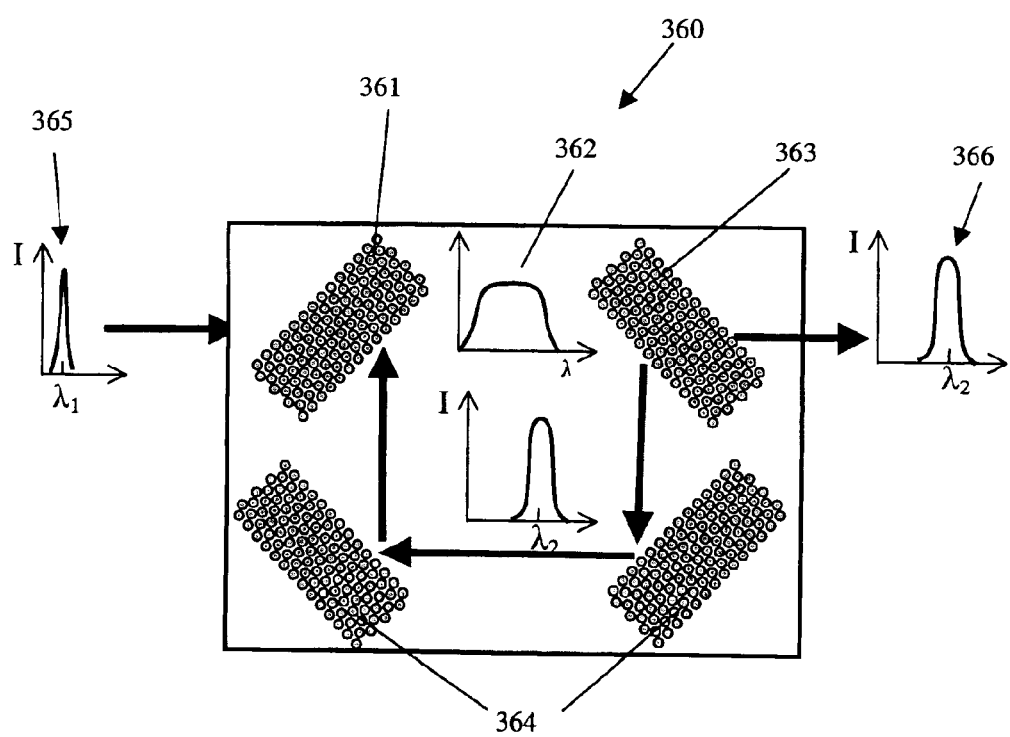
FIG. 36 shows an OPO with feedback via on-chip discrete photonic structures; and, FIG. 37 shows an OPO with feedback via an on-chip waveguide and waveguide beamsplitters.

FIG. 36 shows an embodiment of an OPO 360 according to the present invention comprising a compact planar waveguide 362 with feedback provided by four discrete 1-D or 2-D photonic crystals 361, 363, 364. One of the four crystals 361 is designed to transmit the input 365 and another of the four crystals 363 is designed to be partially transmitting at the resonating wavelength in order to provide an output 366.

Figure 37:
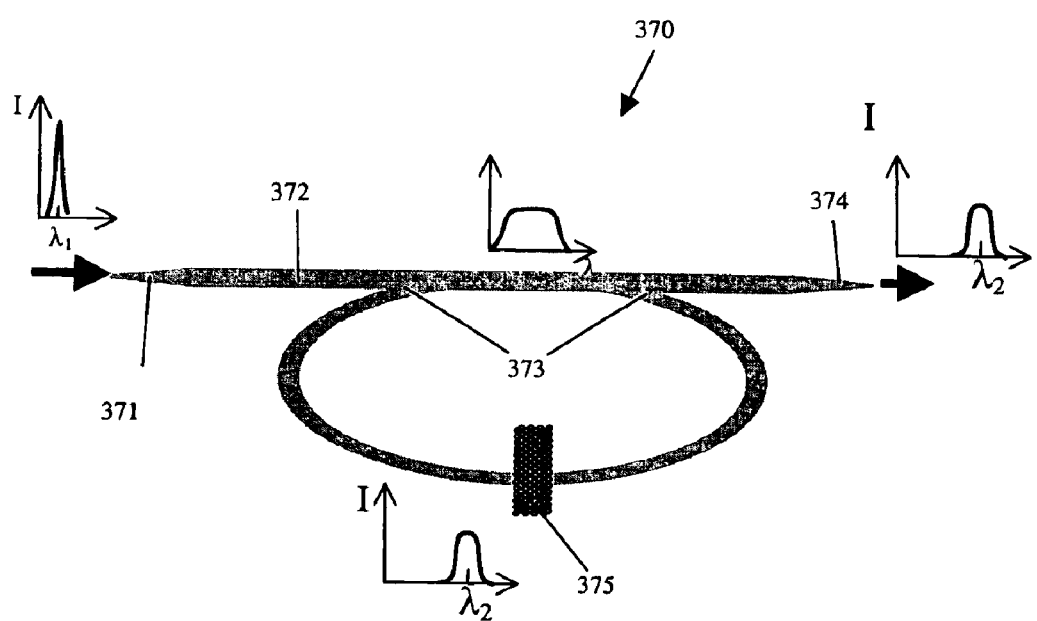

FIG. 37 shows another embodiment 370 comprising an extended waveguide 372 with input 371 and output 374 tapers, and on-chip beam splitters 373 to couple light out into the feedback loop. Wavelength selectivity and tuning is provided by photonic crystal 375 located within the feedback loop.

Optical parametric amplification of a second input beam at the signal or idler wavelength is also possible using a planar waveguide according to the present invention. The arrangement is much the same as the OPO above but without any feedback mechanism. In all parametric device embodiments it is preferred that the nonlinearly generating region comprises a structure to modify the dispersion of the planar waveguide. This may be provided by photonic crystal structures or multilayer structures as described above, or any other suitable structure. In order for accurate phase-matching and efficient operation to be achieved, it is preferred that the total dispersion is in the anomalous regime for the wavelengths of interest.

In summary, the present invention provides an extremely flexible nonlinear 100 device, which substantially enhances the bandwidth accessible in the nonlinear optical interaction. The use of a planar waveguide formed from material having a high linear and nonlinear refractive index combines the benefit of strong optical confinement and high intensity with high material nonlinearity. The net result is an extremely efficient nonlinear interaction with a considerably enhanced accessible bandwidth. The device has particular application in optical continuum and supercontinuum generation, but also in broadly tunable parametric devices. The geometry of the planar device makes it particularly amenable to the integration of other functionality on the same chip and also compatible with modem photonic integrated circuits. As has been described, there are very many embellishments that can be made to the basic device to incorporate added functionality. In particular, the use of tapers, ridge and rib type waveguides, and other modifying structures for pulse compression, dispersion control and filtering (particularly photonic crystal structures) has been shown to improve greatly the performance and range of applications of the device.

What is claimed is:

1. A nonlinear optical device comprising a planar optical waveguide, at least a section of the planar optical waveguide being operative to generate an optical output from at least a portion of an optical input having an input bandwidth by means of a non-linear optical process, the optical output having a wavelength within an accessible bandwidth, wherein the planar optical waveguide is operative to enhance the accessible bandwidth such that the ratio of the accessible bandwidth to the input bandwidth is at least 4, the term "bandwidth" being defined here as the wavelength interval beyond which the spectral radiant intensity remains below a level of −30 decibels (0.001) of the maximum value.

2. A non-linear optical device according to claim 1, wherein the ratio of the accessible bandwidth to the input bandwidth is at least 10.

3. A non-linear optical device according to claim 1, wherein the planar optical waveguide has a core layer with a refractive index of at least 1.7.

4. A nonlinear optical device according to claim 1, wherein the planar optical waveguide has a core layer which comprises a material selected from a group including the oxides of tantalum, hafnium, zirconium, titanium and aluminium.

5. A non-linear optical device according to claim 1, wherein the planar optical waveguide has a core layer which comprises a material doped with a rare earth element.

6. An optical wavelength converter according to claim 1, wherein the planar optical waveguide has a core layer which comprises silicon nitride (SiN).

7. A non-linear optical device according to claim 1, wherein the accessible bandwidth is at least 200 nm.

8. A non-linear optical device according to claim 1, wherein the accessible bandwidth is at least 500 nm.

9. A non-linear optical device according to claim 1, wherein the ratio of the accessible bandwidth to the input bandwidth is non-linearly dependent the intensity of the optical input.

10. A non-linear optical device according to claim 1, wherein the non-linear optical process comprises one or more processes selected from a group which includes self-phase modulation, self-focussing, four-wave mixing, Raman scattering and soliton formation.

11. A non-linear optical device according to claim 1, wherein the planar waveguide comprises a ridge.

12. A non-linear optical device according to claim 1, wherein the planar waveguide comprises a rib.

13. A non-linear optical device according to claim 1, wherein a portion of the planar waveguide is tapered.

14. A non-linear optical device according to claim 1, wherein a portion of the planar waveguide includes a structure, the structure being operative to modify the optical input and/or optical output.

15. A non-linear optical device according to claim 14, wherein the structure comprises a photonic structure.

16. A non-linear optical device according to claims 14, wherein the structure is operative to filter the optical input and/or optical output.

17. A non-linear optical device according to claim 14, wherein the structure is operative to compress temporally the optical input and/or optical output.

18. A non-linear optical device according to claims 14, wherein the structure is operative to modify the optical dispersion characteristics of the planar optical waveguide.

19. A non-linear optical device according to claim 1, wherein the planar optical waveguide comprises a further planar layer which is operative to modify the optical dispersion characteristics of the planar optical waveguide.

20. An optical continuum source comprising a non-linear optical device according to claim 1, wherein the optical output has an optical spectrum comprising an optical continuum as a result of non-linear broadening of the optical input.

21. An optical continuum source according to claim 20, wherein the degree of non-linear broadening is by at least a factor of 4.

22. An optical continuum source according to claim 20, wherein the optical continuum has a bandwidth of at least 200 nm.

23. An optical continuum source according to claim 20, wherein the degree of broadening is non-linearly dependent on the peak intensity of the optical input.

24. An optical continuum source according to claim 20, wherein the non-linear optical process is seeded with an optical seed input.

25. An optical parametric oscillator comprising a non-linear optical device according to claim 1 and means for providing optical feedback at a wavelength within the accessible bandwidth.

26. An optical parametric oscillator according to claim 25, wherein the optical feedback means is provided at least in part by a photonic structure.

27. An optical parametric amplifier comprising a non-linear optical device according to claim 1 adapted to receive a further optical input to be amplified at a wavelength within the accessible bandwidth.

28. An optical system including a non-linear optical device according to claim 1.

29. An optical continuum source comprising a planar optical waveguide, at least a section of the planar optical waveguide being operative to generate an optical output having an output bandwidth from at least a portion of an optical input having an input bandwidth by means of a non-linear optical process, wherein the optical output has an optical spectrum comprising an optical continuum as a result of nonlinear broadening of the optical input, the planar optical waveguide being operative to enhance the ratio of the output bandwidth to the input bandwidth to at least 4, the term "bandwidth" being defined here as the wavelength interval beyond which the spectral radiant intensity remains below a level of −30 decibels (0.001) of the maximum value.

30. An optical continuum source according to claim 29, wherein the output bandwidth of the optical continuum is at least 200 nm.

31. An optical continuum source according to claim 29, wherein a portion of the planar waveguide includes a structure, the structure being operative to modify the optical dispersion characteristics of the planar optical waveguide.

32. An optical continuum source according to claim 31, wherein the structure comprises a photonic structure.

33. An optical continuum source according to claim 31, wherein the optical dispersion characteristics of the planar optical waveguide are modified to achieve zero dispersion at points along the waveguide.

34. An optical continuum source according to claim 31, wherein the optical dispersion characteristics of the planar optical waveguide are modified to achieve normal dispersion at a predetermined wavelength.

35. An optical parametric oscillator comprising:
a planar optical waveguide, at least a section of the planar optical waveguide being operative to generate an optical output from at least a portion of an optical input having an input bandwidth by means of a non-linear optical process, the optical output having a wavelength within an accessible bandwidth, wherein the planar optical waveguide is operative to enhance the accessible bandwidth such that the ratio of the accessible bandwidth to the input bandwidth is at least 4, the term "bandwidth" being defined here as the wavelength interval beyond which the spectral radiant intensity remains below a level of −30 decibels (0.001) of the maximum value; and,
means for providing optical feedback at a wavelength within the accessible bandwidth.

36. An optical parametric oscillator according to claim 35, wherein the accessible bandwidth is at least 200 nm.

37. An optical parametric oscillator according to claim 35, wherein a portion of the planar waveguide includes a structure, the structure being operative to modify the optical dispersion characteristics of the planar optical waveguide.

38. An optical parametric oscillator according to claim 35, wherein the structure comprises a photonic structure.

39. An optical parametric oscillator according to claim 35, wherein the optical dispersion characteristics of the planar optical waveguide are modified to achieve negative (anomalous) dispersion at a predetermined wavelength.

40. An optical parametric amplifier comprising a planar optical waveguide for receiving a first optical input having a first input bandwidth and a second optical input having a second input bandwidth, at least a section of the planar optical waveguide being operative to amplify the second optical input by generating an optical output from at least a portion of the first optical input by means of a nonlinear optical process, the optical output and the second optical input having a wavelength within an accessible bandwidth, wherein the planar optical waveguide is operative to enhance the accessible bandwidth such that the ratio of the accessible bandwidth to the first input bandwidth is at least 4, the term "bandwidth" being defined here as the wavelength interval beyond which the spectral radiant intensity remains below a level of −30 decibels (0.001) of the maximum value.

41. An optical parametric amplifier according to claim 40, wherein the accessible bandwidth is at least 200 nm.

42. An optical parametric amplifier according to claim 40, wherein a portion of the planar waveguide includes a structure, the structure being operative to modify the optical dispersion characteristics of the planar optical waveguide.

43. An optical parametric amplifier according to claim 40, wherein the structure comprises a photonic structure.

44. An optical parametric amplifier according to claim 40, wherein the optical dispersion characteristics of the planar optical waveguide are modified to achieve negative (anomalous) dispersion at a predetermined wavelength.

45. A method for enhancing the bandwidth accessible in the generation of an optical output, comprising the step of providing a planar optical waveguide for receiving an optical input having an input bandwidth, wherein at least a section of the planar optical waveguide is operative to generate an optical output from at least a portion of the optical input by means of a non-linear optical process, the optical output having a wavelength within an accessible bandwidth, wherein the planar optical waveguide is operative to enhance the accessible bandwidth such that the ratio of the accessible bandwidth to the input bandwidth is at least 4, the term "bandwidth" being defined here as the wavelength interval beyond which the spectral radiant intensity remains below a level of −30 decibels (0.001) of the maximum value.

46. A method for generating an optical signal comprising the steps of:
receiving an optical input signal having an input bandwidth at an optical input to a planar optical waveguide;
guiding the optical input signal along the planar optical waveguide; and,
generating an optical output signal from at least a portion of the optical input signal by means of a nonlinear optical process in at least a section of the planar optical waveguide, the optical output signal having a wavelength within an accessible bandwidth, wherein the planar optical waveguide is operative to enhance the accessible bandwidth such that the ratio of the accessible bandwidth to the input bandwidth is at least 4, the term "bandwidth" being defined here as the wavelength interval beyond which the spectral radiant intensity remains below a level of −30 decibels (0:001) of the maximum value.

* * * * *